United States Patent
Yoneoka

(10) Patent No.: US 10,884,794 B2
(45) Date of Patent: Jan. 5, 2021

(54) CONTROL APPARATUS FOR INFORMATION PROCESSING SYSTEM, COMPUTER-READABLE NON-TRANSITORY RECORDING MEDIUM HAVING PROGRAM STORED THEREIN, AND INFORMATION PROCESSING METHOD WHICH ALLOCATE PROCESSES EXECUTED TO ACQUIRE DESIRED RESULT TO PROCESSING APPARATUS TO PERFORM FOR PIPELINE PROCESSING

(71) Applicant: FUJITSU LIMITED, Kawasaki (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 283 days.

(21) Appl. No.: 15/659,698

(22) Filed: Jul. 26, 2017

(65) Prior Publication Data

US 2018/0046504 A1    Feb. 15, 2018

(30) Foreign Application Priority Data

Aug. 9, 2016  (JP) .................................. 2016-156247

(51) Int. Cl.
*G06F 9/48*  (2006.01)
*G06F 9/54*  (2006.01)

(52) U.S. Cl.
CPC ............ *G06F 9/4881* (2013.01); *G06F 9/541* (2013.01)

(58) Field of Classification Search
CPC .. G06F 17/5027; G06F 17/5054; G06F 21/76; G06F 8/656; G06F 9/44505; G06F 9/5077; G06F 9/4881; G06F 9/541
See application file for complete search history.

(56) References Cited

U.S. PATENT DOCUMENTS 5,999,990 A      12/1999  Sharrit et al.
7,093,225 B2 *    8/2006  Osann, Jr. ........... G06F 17/5054
                                                                        438/129

(Continued)

FOREIGN PATENT DOCUMENTS

JP     2000-321561      11/2000
JP     2002-516511       6/2002

(Continued)

OTHER PUBLICATIONS

S. Banerjee et al., PARLGRAN: Parallelism granularity selection for scheduling task chains on dynamically reconfigurable architectures, IEEE, 0-7803-9451-8/06 (Year: 2006).*

*Primary Examiner* — Jorge A Chu Joy-Davila
(74) *Attorney, Agent, or Firm* — Fujitsu Patent Center

(57) ABSTRACT

A control apparatus is communicably connected to a plurality of processing apparatuses, including a processor configured to determine whether the sum of an execution time of a first process, an execution time of a second process, and a time taken for a first processing apparatus among the plurality of processing apparatuses to rewrite a logic for executing the first process to a logic for executing the second process is equal to or smaller than a unit time; determine whether a data traffic between the plurality of processing apparatuses is equal to or smaller than a threshold when the first processing apparatus executes the first and second processes, and cause the first processing apparatus to execute the first and second processes when it is determined that the sum is equal to or smaller than the unit time and the data traffic is equal to or smaller than the threshold.

16 Claims, 19 Drawing Sheets

(56) References Cited

U.S. PATENT DOCUMENTS

| | | | |
|---|---|---|---|
| 2007/0202205 A1 | 8/2007 | Tsujita et al. | |
| 2007/0264368 A1 | 11/2007 | Tsujita | |
| 2010/0083185 A1* | 4/2010 | Sakai | G06F 8/433 |
| | | | 715/853 |
| 2010/0228958 A1 | 9/2010 | Naito et al. | |
| 2011/0047554 A1* | 2/2011 | Lakshmanan | H04L 67/1002 |
| | | | 718/105 |
| 2011/0238954 A1 | 9/2011 | Naito et al. | |
| 2012/0210142 A1* | 8/2012 | Ichiki | G06F 1/3209 |
| | | | 713/300 |
| 2013/0268937 A1* | 10/2013 | Woo | G06F 9/5044 |
| | | | 718/102 |
| 2015/0095918 A1* | 4/2015 | Alameldeen | G06F 12/0811 |
| | | | 718/104 |
| 2016/0020968 A1* | 1/2016 | Aumann | H04L 43/062 |
| | | | 370/252 |
| 2018/0198855 A1* | 7/2018 | Wang | G06F 9/4881 |
| 2019/0052274 A1* | 2/2019 | Munday | H03K 19/17756 |

FOREIGN PATENT DOCUMENTS

| | | |
|---|---|---|
| JP | 2005-165435 | 6/2005 |
| JP | 2008-512345 | 4/2008 |
| JP | 2010-026607 | 2/2010 |
| JP | 2010-205108 | 9/2010 |
| JP | 2011-203920 | 10/2011 |

* cited by examiner

US 10,884,794 B2

CONTROL APPARATUS FOR INFORMATION PROCESSING SYSTEM, COMPUTER-READABLE NON-TRANSITORY RECORDING MEDIUM HAVING PROGRAM STORED THEREIN, AND INFORMATION PROCESSING METHOD WHICH ALLOCATE PROCESSES EXECUTED TO ACQUIRE DESIRED RESULT TO PROCESSING APPARATUS TO PERFORM FOR PIPELINE PROCESSING

CROSS-REFERENCE TO RELATED APPLICATION

This application is based upon and claims the benefit of priority of the prior Japanese Patent application No. 2016-156247, filed on Aug. 9, 2016, the entire contents of which are incorporated herein by reference.

FIELD

The embodiment(s) discussed herein is (are) directed (related) to a control apparatus, an information processing system, a computer-readable non-transitory recording medium having program stored therein, and an information processing method.

BACKGROUND

An information processing system that allocates a plurality of processes executed to acquire a desired result to a plurality of field programmable gate arrays (FPGAs) to perform pipeline processing is known. In such an information processing system, a plurality of FPGAs is used as an accelerator of a central processing unit (CPU). Since a number of FPGAs are mounted on the information processing system, it is possible to accelerate data processing.

The respective processes allocated to the plurality of FPGAs are executed in a predetermined unit time. However, the execution time (which may be referred to as "processing time") of the respective processes may be different.

In pipeline processing, a processing order of the respective processes allocated to the plurality of FPGAs is defined. When it is defined such that a second process is to be executed after a first process is executed, the second process is not executed until the first process is completed.

Patent Document 1: Japanese Laid-open Patent Publication No. 2010-026607
Patent Document 2: Japanese National Publication of International Patent Application No. 2002-516511
Patent Document 3: Japanese Laid-open Patent Publication No. 2010-205108
Patent Document 4: Japanese Laid-open Patent Publication No. 2011-203920
Patent Document 5: Japanese Laid-open Patent Publication No. 2005-165435

When the execution time of a process allocated to a certain FPGA is shorter than a predetermined unit time, a processing empty time may occur in the FPGA, and the utilization efficiency of the FPGA may decrease.

SUMMARY

Due to this, this control apparatus is a control apparatus communicably connected to a plurality of processing apparatuses, including: a processor configured to: determine whether the sum of an execution time of a first process, an execution time of a second process, and a time taken for a first processing apparatus among the plurality of processing apparatuses to rewrite a logic for executing the first process to a logic for executing the second process is equal to or smaller than a unit time; determine whether a data traffic between the plurality of processing apparatuses is equal to or smaller than a threshold when the first processing apparatus executes the first and second processes; and cause the first processing apparatus to execute the first and second processes when it is determined that the sum is equal to or smaller than the unit time and it is determined that the data traffic is equal to or smaller than the threshold.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

DESCRIPTION OF EMBODIMENTS

Figure 1:
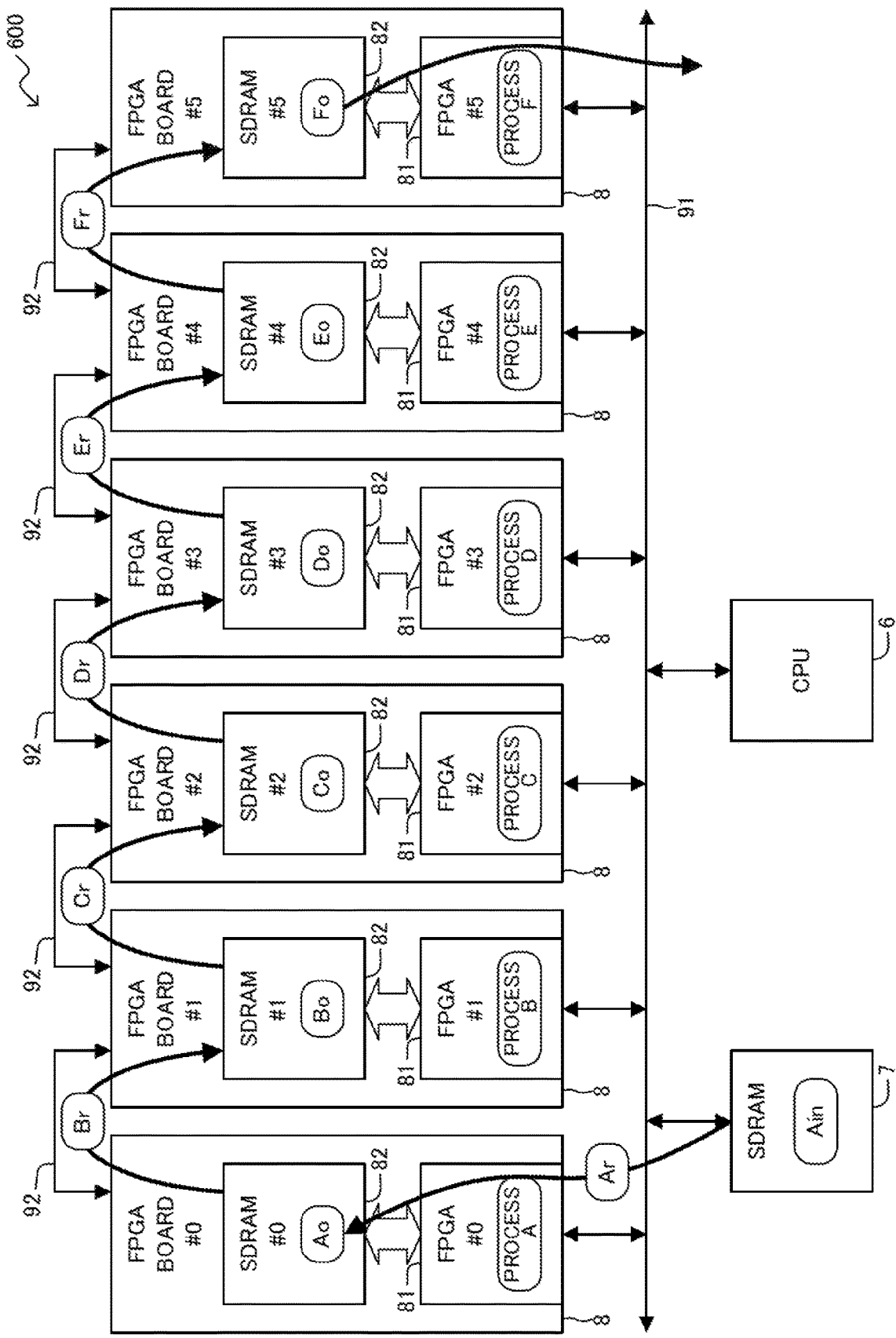
FIG. 1 is a block diagram for describing data pipeline processing according to a related example.

Hereinafter, an exemplary embodiment will be described with reference to the drawings. However, the embodiment described below is an example only, and various modifications or techniques that are not explicitly described in the embodiment may also be applied. That is, the present embodiment may be modified in various ways without departing from the spirit thereof.

Each drawing is not intended to include the constituent elements illustrated in the drawing only but may include other functions and the like.

In the drawings, similar portions are denoted by the same reference numerals, and the description thereof will not be provided.

[A] RELATED EXAMPLE

FIG. 1 is a block diagram for describing data pipeline processing (which may be simply referred to as "pipeline processing") according to a related example.

As illustrated in FIG. 1, an information processing system 600 of the related example includes a CPU 6, an SDRAM 7, and a plurality of (in the illustrated in example, six) FPGA boards 8 (which may be referred to as FPGA boards #0 to #5). CPU is an abbreviation of central processing unit and SDRAM is an abbreviation of synchronous dynamic random access memory.

The CPU 6, the SDRAM 7, and the FPGA boards 8 are communicably connected by a common bus 91. Moreover, two FPGA boards 8 provided at adjacent positions are communicably connected by a broadband bus 92. In the example illustrated in FIG. 1, the broadband bus 92 connects the FPGA boards #0 and #1, the FPGA boards #1 and #2, and the FPGA boards #2 and #3. Moreover, in the example illustrated in FIG. 1, the broadband bus 92 connects the FPGA boards #3 and #4 and the FPGA boards #4 and #5. That is, the plurality of FPGA boards 8 are connected in a row by the broadband bus 92 (this connection may be referred to as "cascade connection" or "tandem connection").

The SDRAM 7 is an example of a random access memory (RAM) and may be used as a primary recording memory or a working memory.

The CPU 6 is a processing apparatus that performs various control and arithmetic operations, for example, and implements various functions by executing an operating system (OS) or a program stored in a read only memory (ROM) (not illustrated).

The FPGA board 8 includes FPGAs 81 (which may be referred to as FPGAs #0 to #5) and SDRAMs 82 (which may be referred to as SDRAMs #0 to #5). In the example illustrated in FIG. 1, the FPGA boards #0 to #5 include FPGAs #0 to #5 and SDRAMs #0 to #5, respectively.

The FPGA 81 is an integrated circuit which can be configured arbitrarily. In the example illustrated in FIG. 1, the FPGAs #0 to #5 execute processes A to F, respectively.

The SDRAM 82 is an example of a RAM and may be used as a primary recording memory or a working memory. The SDRAM 82 stores the results of processes executed by the FPGA 81. In the example illustrated in FIG. 1, the SDRAMs #0 to #5 store items of output data Ao to Fo, respectively, as the output of the processes executed by the FPGA 81. The items of output data Ao to Fo are generated when the processes A to F are executed, respectively.

The information processing system 600 illustrated in FIG. 1 performs pipeline processing by allocating the six processes A to F executed to acquire the items of output data Fo to the six FPGAs #0 to #5, respectively.

Hereinafter, the pipeline processing of the information processing system 600 according to the related example will be described with reference to FIG. 1.

First, input data Ain stored in the SDRAM 7 is read via the common bus 91 as read data Ar and the FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 92 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 92 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #3 via the broadband bus 92 as read data Dr. The FPGA #3 executes a process D by using the read data Dr. The output of the process D is stored in the SDRAM #3 as output data Do.

The output data Do stored in the SDRAM #3 is transferred from the FPGA board #3 to the FPGA board #4 via the broadband bus 92 as read data Er. The FPGA #4 executes a process E by using the read data Er. The output of the process E is stored in the SDRAM #4 as output data Eo.

The output data Eo stored in the SDRAM #4 is transferred from the FPGA board #4 to the FPGA board #5 via the broadband bus 92 as read data Fr. The FPGA #5 executes a process F by using the read data Fr. The output of the process F is stored in the SDRAM #5 as the output data Fo.

The output data Fo stored in the SDRAM #5 is output from the FPGA board #5 via the common bus 91 and is stored in the SDRAM 7, for example.

Figure 2:
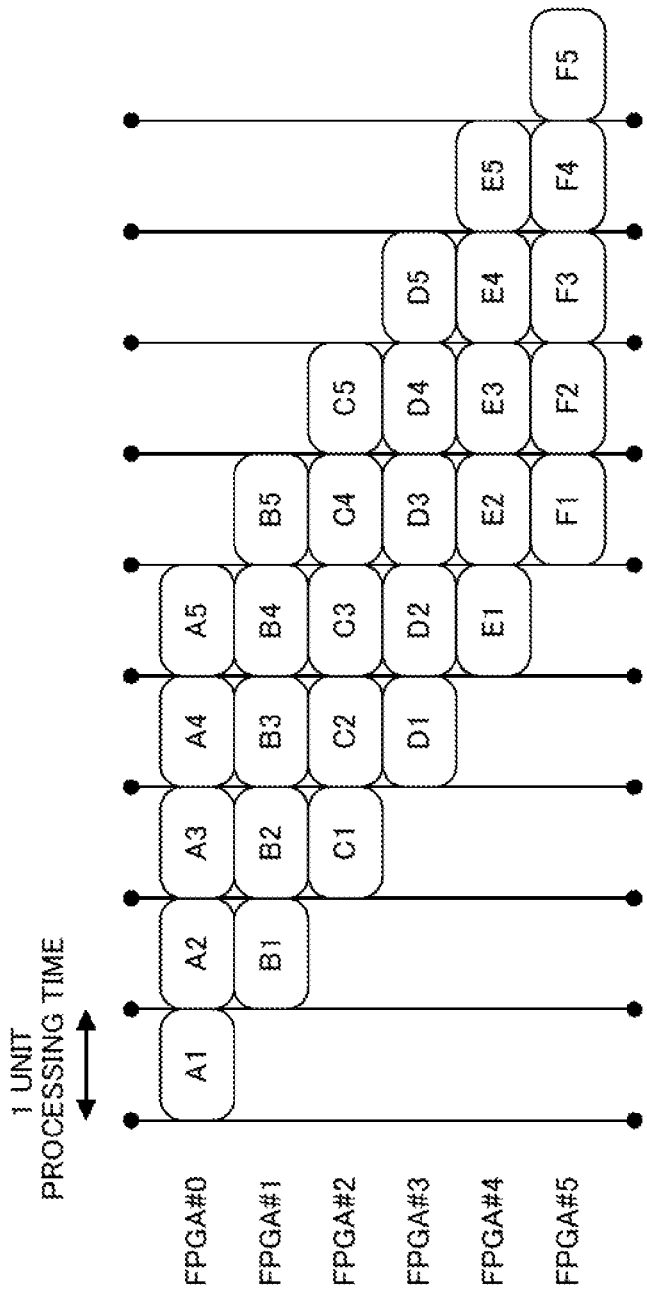
FIG. 2 is a diagram for describing an execution order of the data pipeline processing illustrated in FIG. 1.

FIG. 2 is a diagram for describing an execution order of the data pipeline processing illustrated in FIG. 1.

The respective processes allocated to the plurality of FPGAs 81 are executed within a predetermined unit time (which may be referred to as "1 unit processing time"). The unit time may include a transfer time between the FPGA boards 8.

For example, in the case of processing a video having the frame rate of 30 frame/sec, the processing time allowed for one frame is 33 msec. The functions of the processes A to F allocated to the FPGAs #0 to #5, respectively, may be subdivided such that the processing time thereof does not exceed 33 msec.

In the example illustrated in FIG. 2, the FPGA #0 executes processes A1 to A5, the FPGA #1 executes processes B1 to B5, and the FPGA #2 execute processes C1 to C5. Moreover, in the example illustrated in FIG. 2, the FPGA #3 executes processes D1 to D5, the FPGA #4 executes processes E1 to E5, and the FPGA #5 executes processes F1 to F5.

In pipeline processing, a processing order of the respective processes allocated to the plurality of FPGAs 81 is defined. When it is defined such that a second process is to be executed after a first process is executed, the second process is not executed until the first process is completed.

In the example illustrated in FIG. 2, the pipeline processing is executed in the order of processes A, B, C, D, E, and F. Specifically, a process Bn is executed when a process An is completed. A process Cn is executed when the process Bn is completed. A process Dn is executed when the process Cn is completed. A process En is executed when the process Dn is completed. A process Fn is executed when the process En is completed (n is an integer of 1 to 5).

For example, a process B1 is executed when a process A1 is completed. A process C1 is executed when the process B1 is completed. A process D1 is executed when the process C1 is completed. A process E1 is executed when the process D1 is completed. A process F1 is executed when the process E1 is completed. The same is true for processes A2 to A5, processes B2 to B5, processes C2 to C5, processes D2 to D5, processes E2 to E5, and processes F2 to F5.

[B] EMBODIMENT

[B-1] System Configuration

Figure 3:
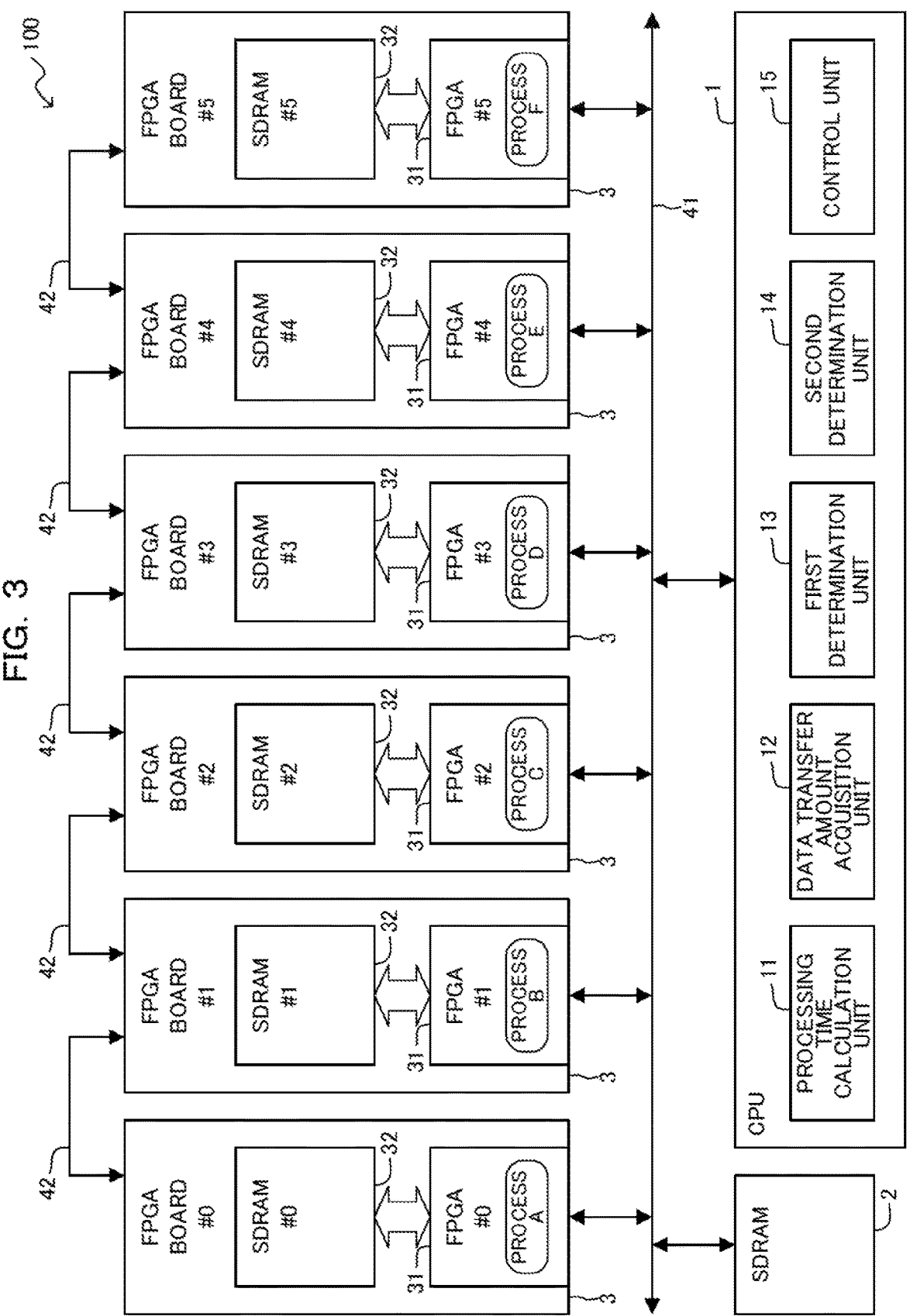
FIG. 3 is a block diagram illustrating a hardware configuration example and a software configuration example of an information processing system according to an example of an embodiment.

FIG. 3 is a block diagram illustrating a hardware configuration example and a software configuration example of an information processing system 100 according to an example of the embodiment.

As illustrated in FIG. 3, the information processing system 100 of an example of the embodiment includes a CPU 1, an SDRAM 2, and a plurality of (in the illustrated in example, six) FPGA boards 3 (which may be referred to as FPGA boards #0 to #5).

The CPU 1, the SDRAM 2, and the FPGA boards 3 are communicably connected by a common bus 41. Moreover, two FPGA boards 3 provided at adjacent positions are communicably connected by a broadband bus 42. In the example illustrated in FIG. 3, the broadband bus 42 connects the FPGA boards #0 and #1, the FPGA boards #1 and #2, and the FPGA boards #2 and #3. Moreover, in the example illustrated in FIG. 3, the broadband bus 42 connects the FPGA boards #3 and #4 and the FPGA boards #4 and #5. That is, the plurality of FPGA boards 3 are connected in a row (this connection may be referred to as "cascade connection" or "tandem connection").

The SDRAM 2 is an example of a RAM and may be used as a primary recording memory or a working memory.

The FPGA board 3 includes FPGAs 31 (which may be referred to as FPGAs #0 to #5) and SDRAMs 32 (which may be referred to as SDRAMs #0 to #5). In the example illustrated in FIG. 3, the FPGA boards #0 to #5 include FPGAs #0 to #5 and SDRAMs #0 to #5, respectively.

The FPGA 31 is an integrated circuit which can be configured arbitrarily and re-configured logic.

The SDRAM 32 is an example of a RAM and may be used as a primary recording memory or a working memory. The SDRAM 32 stores the results of processes executed by the FPGA 31.

The CPU 1 is a processing apparatus that performs various control and arithmetic operations, for example, and implements various functions by executing an OS or a program stored in a ROM (not illustrated). That is, as illustrated in FIG. 3, the CPU 1 may function as a processing time calculation unit 11, a data transfer amount acquisition unit 12, a first determination unit 13, a second determination unit 14, and a control unit 15.

A program for implementing the functions of the processing time calculation unit 11, the data transfer amount acquisition unit 12, the first determination unit 13, the second determination unit 14, and the control unit 15 may be provided in a form of being recorded on a computer-readable recording medium such as, for example, a flexible disk, CD (CD-ROM, CD-R, CD-RW, and the like), DVD (DVD-ROM, DVD-RAM, DVD-R, DVD+R, DVD-RW, DVD+RW, HD DVD, and the like), a Blu-ray disc, a magnetic disk, an optical disc, an opto-magnetic disk, and the like. The computer (in the present embodiment, the CPU 1) may read the program from the recording medium via a reading apparatus (not illustrated), transmit the program to an internal recording apparatus or an external recording apparatus, store the same therein, and use the same. The program may be recorded on a storage apparatus (recording medium) such as a magnetic disc, an optical disc, or an opto-magnetic disc and be provided from the storage apparatus to the computer via a communication path.

When the functions of the processing time calculation unit 11, the data transfer amount acquisition unit 12, the first determination unit 13, the second determination unit 14, and the control unit 15 are implemented, the program stored in the internal storage apparatus (in the present embodiment, the SDRAM 2) may be executed by the computer (in the present embodiment, the CPU 1). The program recorded on the recording medium may be read and executed by the computer.

The processing time calculation unit 11 calculates the execution time of the respective processes allocated to the plurality of FPGAs 31. The processing time calculation unit 11 may measure the execution time of the processes executed by the FPGA 31. The processing time calculation unit 11 may calculate the execution time of the processes on the basis of data stored in advance in the SDRAM 2, for example.

The processing time calculation unit 11 calculates a time taken for the FPGA 31 to rewrite a logic. The processing time calculation unit 11 may measure the time taken to rewrite the logic executed by the FPGA 31. The processing time calculation unit 11 may calculate the logic rewrite time on the basis of the data stored in advance in the SDRAM 2, for example.

The processing time calculation unit 11 may store the calculated execution time of the respective processes and the logic rewrite time in the SDRAM 2.

The data transfer amount acquisition unit 12 acquires the data transfer amount between the FPGA boards 3 via the broadband bus 42 from the FPGAs 31. The data transfer amount may be measured every unit time by a monitoring circuit 312 (to be described later with reference to FIGS. 4 and 5) provided in the FPGA 31.

The first determination unit 13 determines whether a plurality of processes can be executed by one FPGA 31 in an integrated manner from the viewpoint of processing time. The first determination unit 13 determines whether the sum of the execution time of a first process, the execution time of a second process, and the time taken for a certain FPGA 31 to rewrite a logic for executing the first process to a logic for executing the second process is equal to or smaller than a unit time. The first processing time, the second processing time, and the logic rewrite time may be calculated by the processing time calculation unit 11.

The second determination unit 14 determines whether a plurality of processes can be executed by one FPGA 31 in an integrated manner from the viewpoint of communication load between the FPGA boards 3. The second determination unit 14 determines whether a data traffic between the plurality of FPGAs 31 is equal to or smaller than a threshold when the first and second processes are executed by a certain FPGA 31. The data traffic between the plurality of FPGAs 31 may be acquired from the plurality of FPGAs 31 by the data transfer amount acquisition unit 12.

When the first determination unit 13 determines that the sum of the processing time is equal to or smaller than the unit time and the second determination unit 14 determines that the data traffic is equal to or smaller than the threshold, the control unit 15 causes a certain FPGA 31 to execute the first and second processes in an integrated manner.

When there are three integratable processes or more, the control unit 15 may integrate processes allocated to FPGAs 31 connected at positions closest to an integration destination FPGA 31 in a connection relation between the plurality of FPGAs 31.

Figure 4:
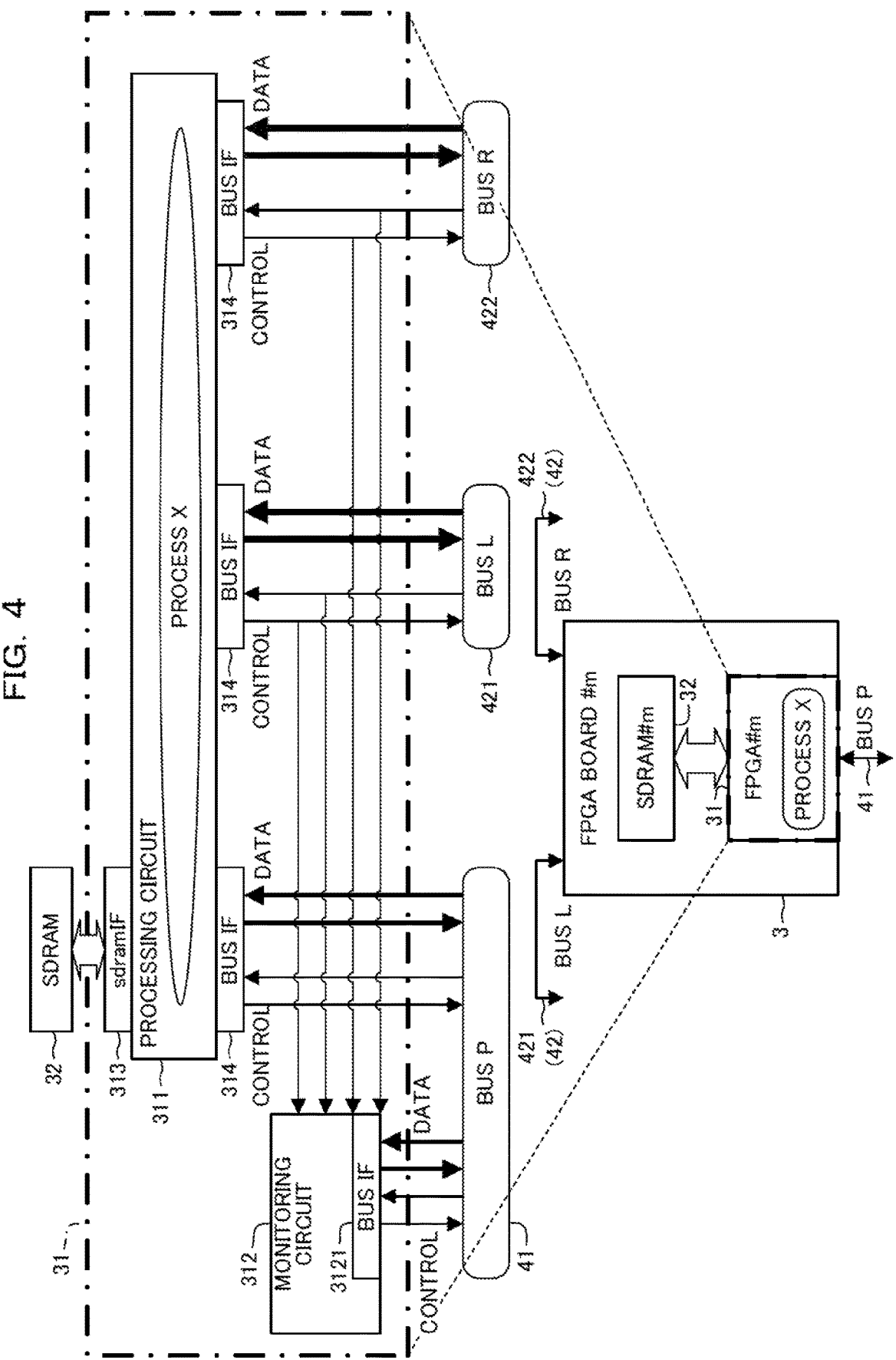
FIG. 4 is a block diagram illustrating a hardware configuration example of an FPGA illustrated in FIG. 3.

FIG. 4 is a block diagram illustrating a hardware configuration example of the FPGA 31 illustrated in FIG. 3.

The FPGA board 3 (which may be referred to as "FPGA board # m") illustrated in FIG. 4 includes the FPGA 31 (which may be referred to as "FPGA # m") and the SDRAM 32 (which may be referred to as "SDRAM # m"). m is an integer of 1 or more. As illustrated in FIG. 4, the FPGA # m executes a process X.

The FPGA board # m is communicably connected to FPGA boards # m−1 and # m+1 (both are not illustrated) by the broadband bus 42. The broadband bus 42 connected to the FPGA board # m includes a bus L 421 and a bus R 422. The bus L 421 connects the FPGAs # m and # m−1. The bus R 422 connects the FPGAs # m and # m+1. In the example illustrated in FIG. 3, it is possible that the FPGA board #0 is not connected to the bus L 421 and the FPGA board #5 is not connected to the bus R 422.

The FPGA board # m is communicably connected to the CPU 1 and the SDRAM 2 (both are not illustrated in FIG. 4) by a common bus (which may be referred to as a "bus P") 41.

As illustrated in FIG. 4, the FPGA 31 includes a processing circuit 311 and a monitoring circuit 312.

The processing circuit 311 executes a process (in the example illustrated in FIG. 4, "process X") allocated to the FPGA 31.

The processing circuit 311 is communicably connected to the SDRAM 32 by a sdramIF (Interface) 313. The processing circuit 311 is connected to the monitoring circuit 312, a bus P 41, a bus L 421, and a bus R 422 by a plurality of (in the illustrated example, three) bus IFs 314. The processing circuit 311 transmits and receives a data signal and a control signal to and from the bus P 41, the bus L 421, and the bus R 422 via the bus IF 314. The control signal transmitted and received between the processing circuit 311 and the bus L 421 and the bus R 422 is also input to the monitoring circuit 312.

The monitoring circuit 312 is an example of a measurement unit and measures (that is, "monitors") the data traffic in the processing circuit 311 every unit time. The monitoring circuit 312 is connected to the bus P 41 via a bus IF 3121. The monitoring circuit 312 transmits and receives a data signal and a control signal via the bus IF 3121.

Figure 5:
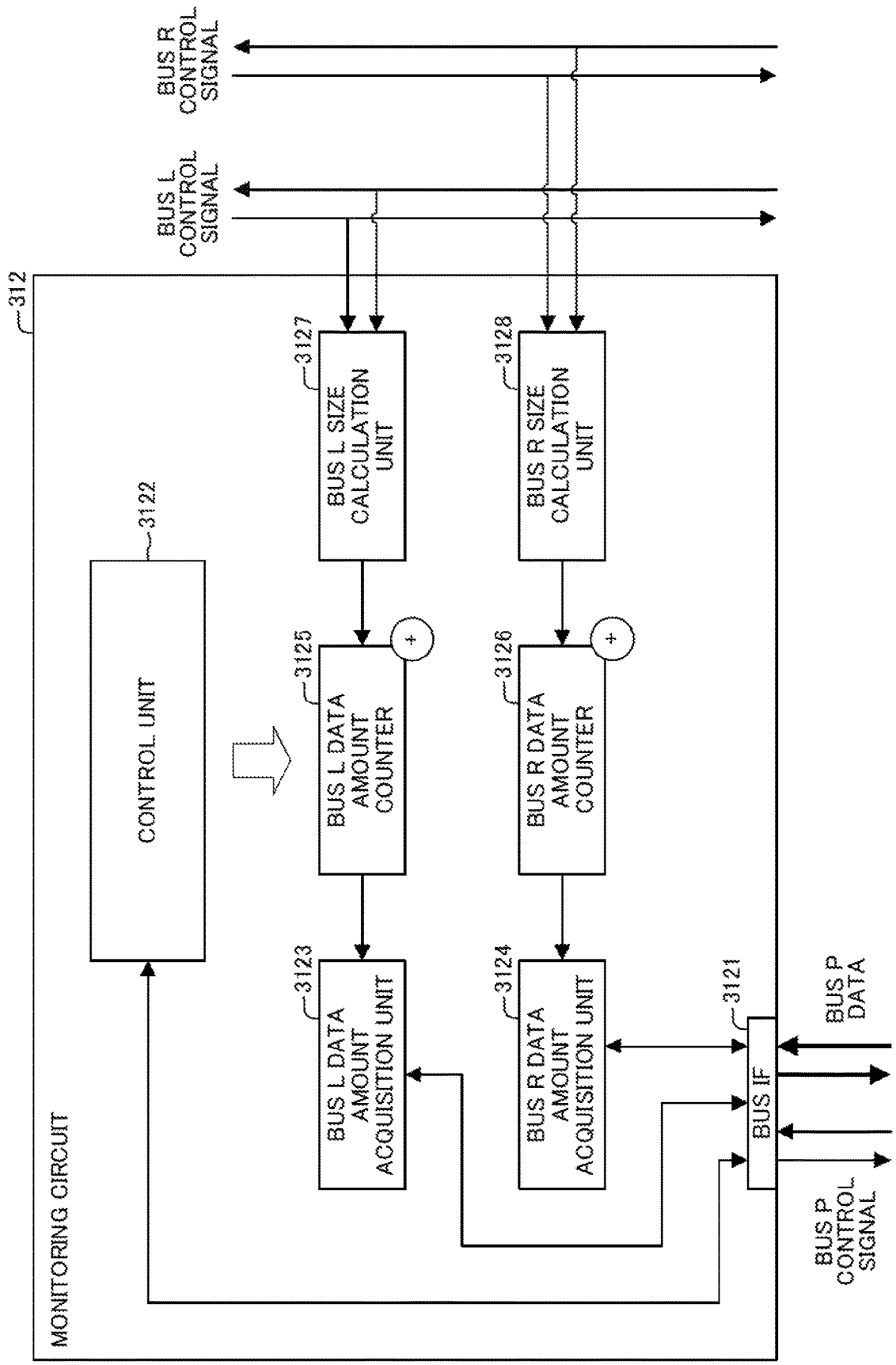
FIG. 5 is a block diagram illustrating a functional configuration of a monitoring circuit illustrated in FIG. 4.

FIG. 5 is a block diagram illustrating a functional configuration of the monitoring circuit 312 illustrated in FIG. 4.

As illustrated in FIG. 5, the monitoring circuit 312 includes a control unit 3122, a bus L data amount acquisition unit 3123, a bus R data amount acquisition unit 3124, a bus L data amount counter 3125, a bus R data amount counter 3126, a bus L size calculation unit 3127, and a bus R size calculation unit 3128.

The bus L size calculation unit 3127 calculates the size of data signals transmitted and received via the bus L 421.

The bus L data amount counter 3125 counts up the data amount on the basis of the size of the data signal calculated by the bus L size calculation unit 3127. The bus L data amount counter 3125 notifies the counted data amount to the bus L data amount acquisition unit 3123 and resets the counted data amount to 0 on the basis of the control of the control unit 3122 when the unit time has elapsed.

The bus L data amount acquisition unit 3123 acquires the data amount of the bus L 421 notified from the bus L data amount counter 3125. The bus L data amount acquisition unit 3123 transmits the acquired data amount of the bus L 421 to the CPU 1 via the bus IF 3121 and the bus P 41.

The bus R size calculation unit 3128 calculates the size of the data signal transmitted and received via the bus R 422.

The bus R data amount counter 3126 counts up the data amount on the basis of the size of the data signal calculated by the bus R size calculation unit 3128. The bus R data amount counter 3126 notifies the counted data amount to the bus R data amount acquisition unit 3124 and resets the counted data amount to 0 on the basis of the control of the control unit 3122 when the unit time has elapsed.

The bus R data amount acquisition unit 3124 acquires the data amount of the bus R 422 notified from the bus R data amount counter 3126. The bus R data amount acquisition unit 3124 transmits the acquired data amount of the bus R 422 to the CPU 1 via the bus IF 3121 and the bus P 41.

The control unit 3122 causes the bus L data amount counter 3125 to notify the counted data amount to the bus L data amount acquisition unit 3123 and reset the counted data amount when the unit time has elapsed. The control unit 3122 causes the bus R data amount counter 3126 to notify the counted data amount to the bus R data amount acquisition unit 3124 and reset the counted data amount when the unit time has elapsed.

Figure 6:
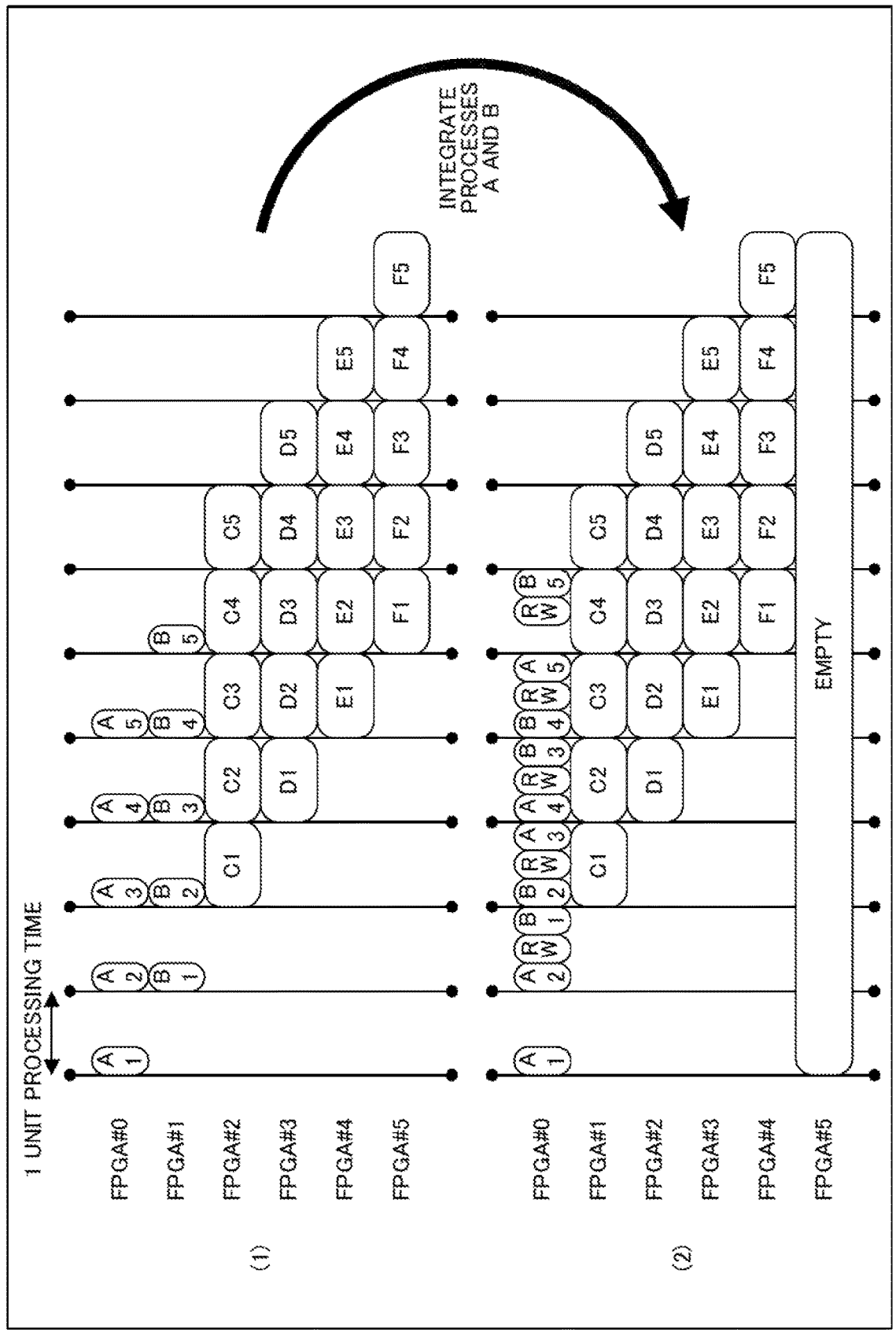
FIG. 6 is a diagram for describing a first example of an execution order of data pipeline processing and an execution order when adjacent processes of the data pipeline processing are integrated.

(1) of FIG. 6 is a diagram for describing a first example of an execution order of data pipeline processing and (2) of FIG. 6 is a diagram for describing an execution order when adjacent processes of the data pipeline processing illustrated in (1) of FIG. 6 are integrated.

In the example illustrated in (1) of FIG. 6, the FPGA #0 executes processes A1 to A5, the FPGA #1 executes processes B1 to B5, and the FPGA #2 executes processes C1 to C5. In the example illustrated in FIG. 2, the FPGA #3 executes processes D1 to D5, the FPGA #4 executes processes E1 to E5, and the FPGA #5 executes processes F1 to F5.

In pipeline processing, a processing order of the respective processes allocated to the plurality of FPGAs 31 is defined. When it is defined such that a second process is to be executed after a first process is executed, the second process is not executed until the first process is completed.

In the example illustrated in (1) of FIG. 6, the pipeline processing is executed in the order of processes A, B, C, D, E, and F. Specifically, a process Bn is executed when a process An is completed. A process Cn is executed when the process Bn is completed. A process Dn is executed when the process Cn is completed. A process En is executed when the process Dn is completed. A process Fn is executed when the process En is completed (n is an integer of 1 to 5).

For example, a process B1 is executed when a process A1 is completed. A process C1 is executed when the process B1 is completed. A process D1 is executed when the process C1 is completed. A process E1 is executed when the process D1 is completed. A process F1 is executed when the process E1 is completed. The same is true for processes A2 to A5, processes B2 to B5, processes C2 to C5, processes D2 to D5, processes E2 to E5, and processes F2 to F5.

In the example illustrated in (1) of FIG. 6, the execution time of the processes A1 to A5 and the processes B1 to B5 is sufficiently smaller than 1 unit processing time. In the example illustrated in (1) of FIG. 6, the execution time of the processes C1 to C5, the processes D1 to D5, the processes E1 to E5, and the processes F1 to F5 is approximately the same as 1 unit processing time.

Figure 7:
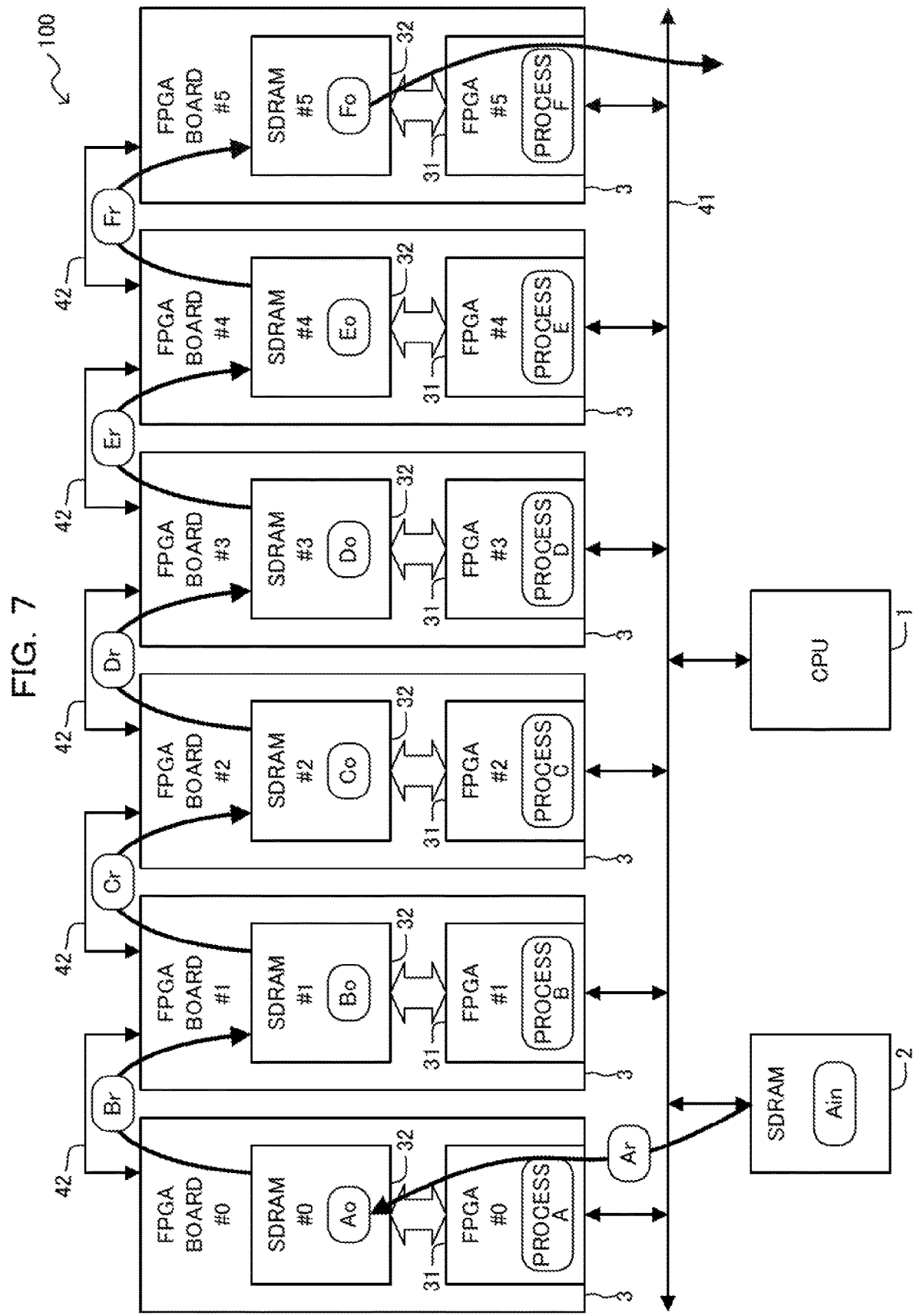
FIG. 7 is a block diagram for describing the flow of data in the data pipeline processing illustrated in FIG. 6.

FIG. 7 is a block diagram for describing the flow of data in the data pipeline processing illustrated in (1) of FIG. 6.

First, input data Ain stored in the SDRAM 2 is read via the common bus 41 as read data Ar and the FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 42 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 42 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #3 via the broadband bus 42 as read data Dr. The FPGA #3 executes a process D by using the read data Dr. The output of the process D is stored in the SDRAM #3 as output data Do.

The output data Do stored in the SDRAM #3 is transferred from the FPGA board #3 to the FPGA board #4 via the broadband bus 42 as read data Er. The FPGA #4 executes a process E by using the read data Er. The output of the process E is stored in the SDRAM #4 as output data Eo.

The output data Eo stored in the SDRAM #4 is transferred from the FPGA board #4 to the FPGA board #5 via the broadband bus 42 as read data Fr. The FPGA #5 executes a process F by using the read data Fr. The output of the process F is stored in the SDRAM #5 as the output data Fo.

The output data Fo stored in the SDRAM #5 is output from the FPGA board #5 via the common bus 41 and is stored in the SDRAM 2, for example.

The control unit 15 causes the FPGA #0 to execute the processes A1 to A5 and B1 to B5 as illustrated in (2) of FIG. 6 when the first determination unit 13 and the second determination unit 14 determine that the processes A1 to A5 and B1 to B5 illustrated in (1) of FIG. 6 can be executed by the FPGA #0 in an integrated manner.

As illustrated in (2) of FIG. 6, the sum of the execution time of the process A, the execution time of the process B, and the time (see "RW" in the drawing) taken for the FPGA #0 to rewrite a logic for executing the process A to a logic for executing the process B is equal to or smaller than the unit time.

The control unit 15 may allocate the processes An and Bn to the FPGA #0 in an integrated manner while following the processing order of processes An to Fn so that the number of logic rewrites is minimized.

The processes C to F allocated to the FPGAs #2 to #5 in (1) of FIG. 6 may be allocated to the FPGAs #1 to #4 as illustrated in (2) of FIG. 6, respectively. In this way, the FPGA #5 enters into an empty state where no process is allocated thereto, and a process other than the processes A to F illustrated in (2) of FIG. 6 can be allocated to the FPGA #5. That is, it is possible to improve the efficiency of pipeline processing and utilize hardware resources effectively.

Figure 8:
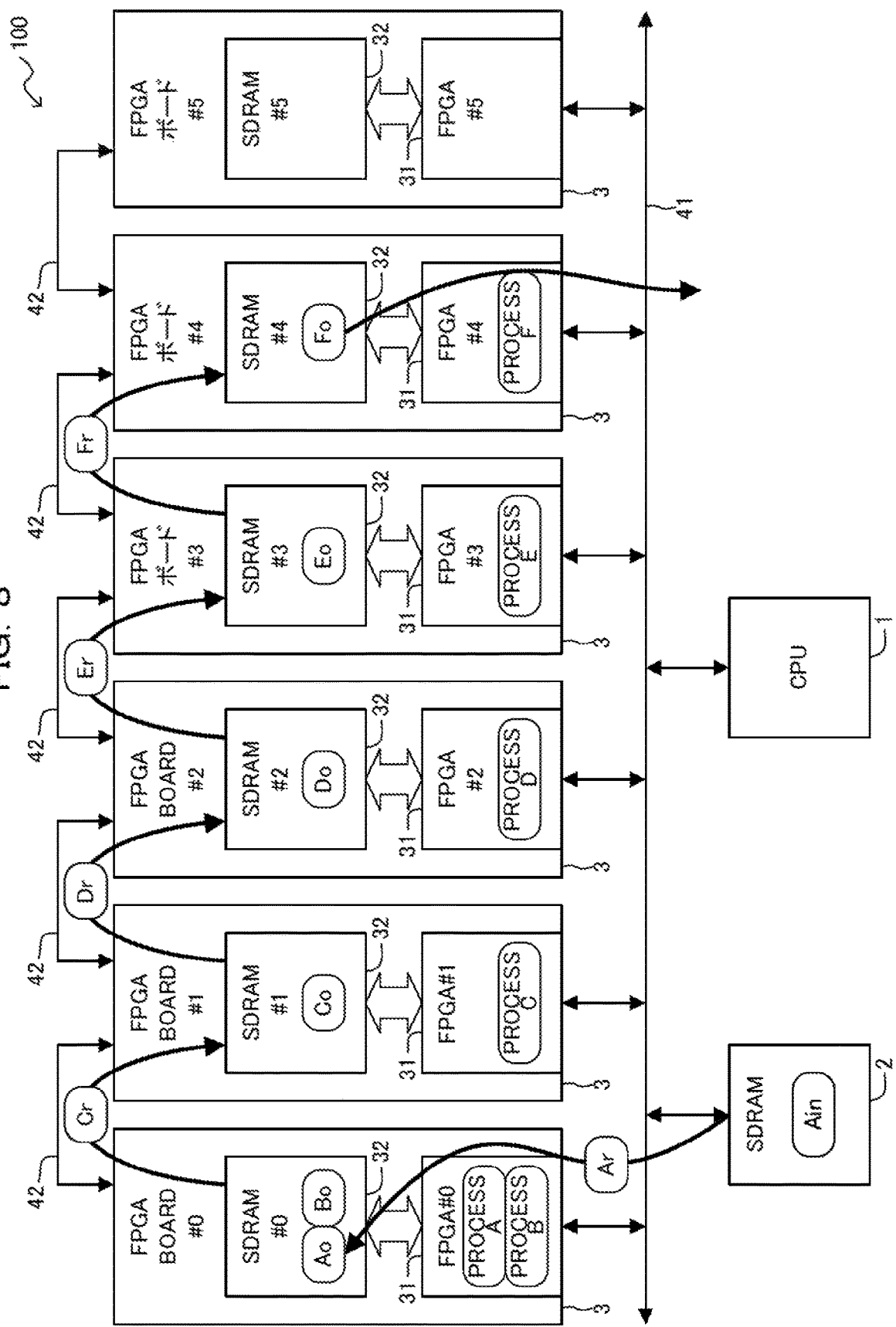
FIG. 8 is a block diagram for describing the flow of data in the data pipeline processing illustrated in FIG. 6.

FIG. 8 is a block diagram for describing the flow of data in the data pipeline processing illustrated in (2) of FIG. 6.

First, input data Ain stored in the SDRAM 2 is read via the common bus 41 as read data Ar and the FPGA #0 executes a process A by using the read data Ar. The output of the process A is stored in the SDRAM #0 as output data Ao.

The FPGA #0 executes a process B by using the output data Ao stored in the SDRAM #0. The output of the process B is stored in the SDRAM #0 as output data Bo.

The output data Bo stored in the SDRAM #0 is transferred from the FPGA board #0 to the FPGA board #1 via the broadband bus 42 as read data Cr. The FPGA #1 executes a process C by using the read data Cr. The output of the process C is stored in the SDRAM #1 as output data Co.

The output data Co stored in the SDRAM #1 is transferred from the FPGA board #1 to the FPGA board #2 via the broadband bus 42 as read data Dr. The FPGA #2 executes a process D by using the read data Dr. The output of the process D is stored in the SDRAM #2 as output data Do.

The output data Do stored in the SDRAM #2 is transferred from the FPGA board #2 to the FPGA board #3 via the broadband bus 42 as read data Er. The FPGA #3 executes a process E by using the read data Er. The output of the process E is stored in the SDRAM #3 as output data Eo.

The output data Eo stored in the SDRAM #3 is transferred from the FPGA board #3 to the FPGA board #4 via the broadband bus 42 as read data Fr. The FPGA #4 executes a process F by using the read data Fr. The output of the process F is stored in the SDRAM #4 as the output data Fo.

The output data Fo stored in the SDRAM #4 is output from the FPGA board #4 via the common bus 41 and is stored in the SDRAM 2, for example.

Figure 9:
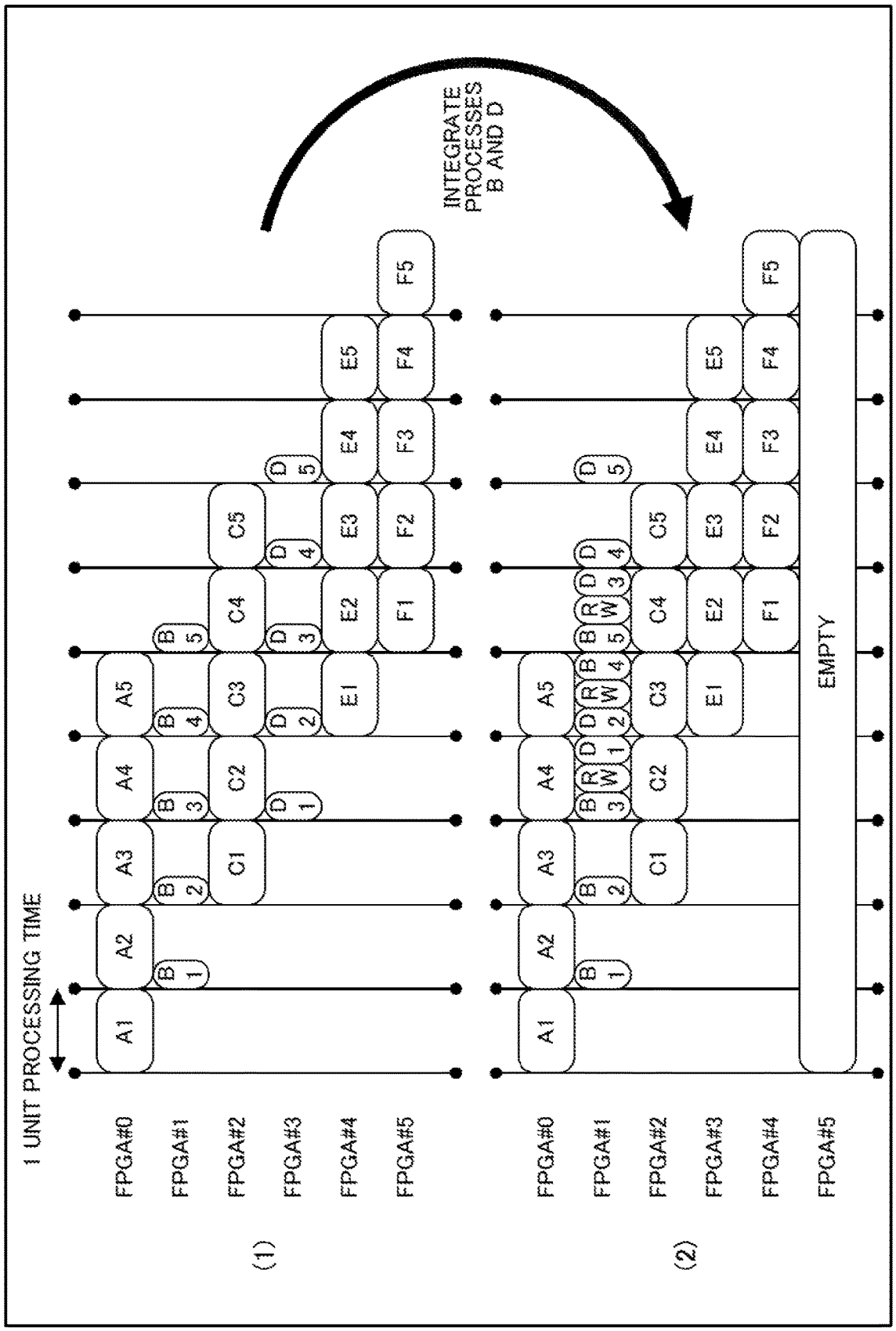
FIG. 9 is a diagram for describing a second example of an execution order of data pipeline processing and an execution order when processes which are not adjacent of the data pipeline processing are integrated.

(1) of FIG. 9 is a diagram for describing a second example of an execution order of data pipeline processing and (2) of FIG. 9 is a diagram for describing an execution order when processes which are not adjacent of the data pipeline processing illustrated in (1) of FIG. 9 are integrated.

In the example illustrated in (1) of FIG. 9, the execution time of the processes B1 to B5 and the processes D1 to D5 is sufficiently smaller than 1 unit processing time. In the example illustrated in (1) of FIG. 9, the execution time of the processes A1 to A5, the processes C1 to C5, the processes E1 to E5, and the processes F1 to F5 is approximately the same as 1 unit processing time.

The flow of data in the data pipeline processing illustrated in (1) of FIG. 9 is similar to the flow of data in the pipeline processing illustrated in FIG. 7.

The control unit 15 causes the FPGA #1 to execute the processes B1 to B5 and D1 to D5 as illustrated in (2) of FIG. 9 when the first determination unit 13 and the second determination unit 14 determine that the processes B1 to B5 and D1 to D5 illustrated in (1) of FIG. 9 can be executed by the FPGA #1 in an integrated manner.

As illustrated in (2) of FIG. 9, the sum of the execution time of the process B, the execution time of the process D, and the time (see "RW" in the drawing) taken for the FPGA

1 to rewrite a logic for executing the process B to a logic for executing the process D is equal to or smaller than the unit time.

The control unit 15 may allocate the processes Bn and Dn to the FPGA #1 in an integrated manner while following the processing order of processes An to Fn so that the number of logic rewrites is minimized.

The processes E and F allocated to the FPGAs #4 and #5 in (1) of FIG. 9 may be allocated to the FPGAs #3 and #4 as illustrated in (2) of FIG. 9, respectively. In this way, the FPGA #5 enters into an empty state where no process is allocated thereto, and a process other than the processes A to F illustrated in (2) of FIG. 9 can be allocated to the FPGA #5. That is, it is possible to improve the efficiency of pipeline processing and utilize hardware resources effectively.

Figure 10:
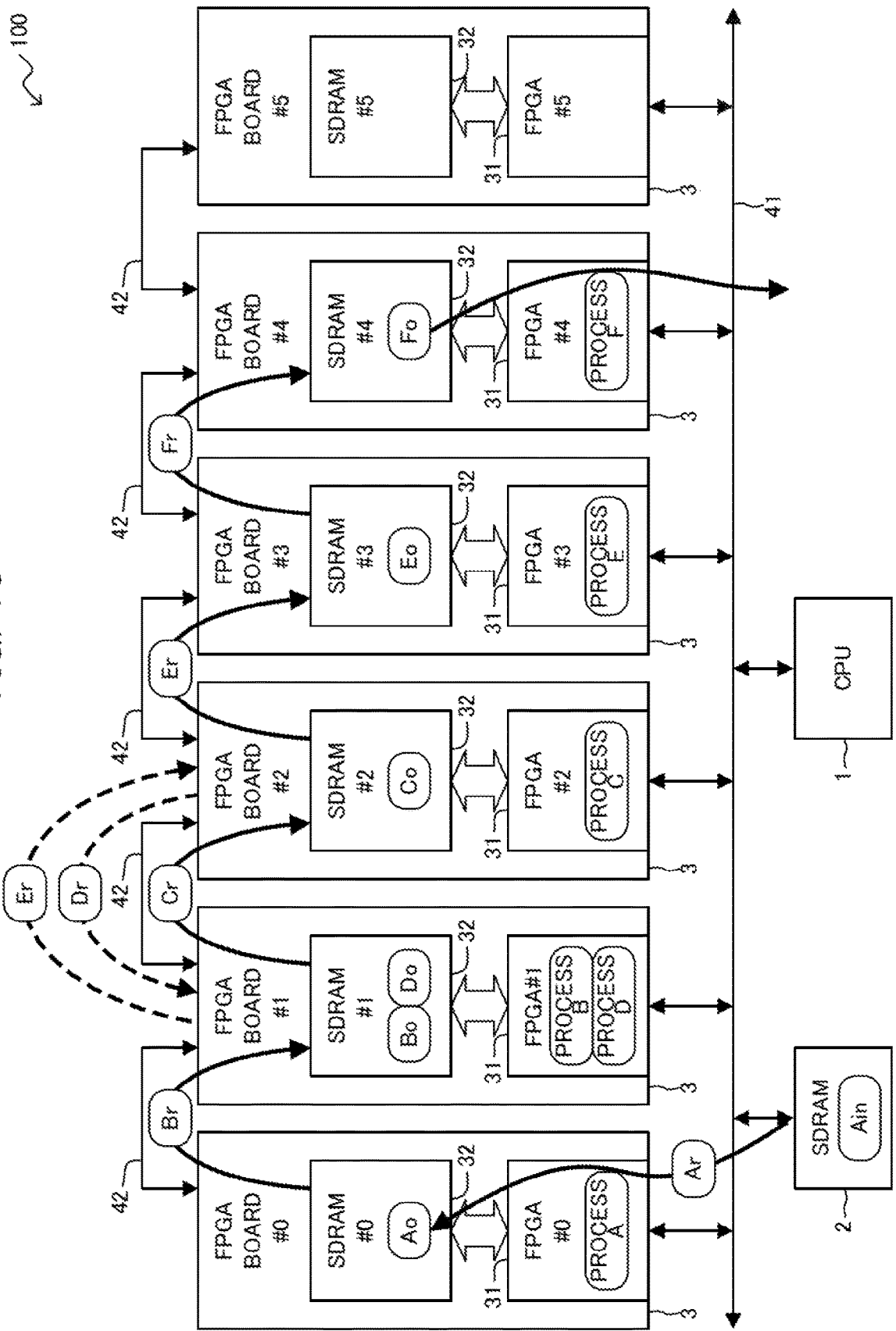
FIG. 10 is a block diagram for describing the flow of data in the data pipeline processing illustrated in FIG. 9.

FIG. 10 is a block diagram for describing the flow of data in the data pipeline processing illustrated in (2) of FIG. 9.

First, input data Ain stored in the SDRAM 2 is read via the common bus 41 as read data Ar and the FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 42 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 42 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #1 via the broadband bus 42 as read data Dr. The FPGA #1 executes a process D by using the read data Dr. The output of the process D is stored in the SDRAM #1 as output data Do.

The output data Do stored in the SDRAM #1 is transferred from the FPGA board #1 to the FPGA board #3 through the FPGA board #2 via the broadband bus 42 as read data Er. The FPGA #3 executes a process E by using the read data Er. The output of the process E is stored in the SDRAM #3 as output data Eo.

The output data Eo stored in the SDRAM #3 is transferred from the FPGA board #3 to the FPGA board #4 via the broadband bus 42 as read data Fr. The FPGA #4 executes a process F by using the read data Fr. The output of the process F is stored in the SDRAM #4 as the output data Fo.

The output data Fo stored in the SDRAM #4 is output from the FPGA board #4 via the common bus 41 and is stored in the SDRAM 2, for example.

In the pipeline processing illustrated in FIG. 10, as indicated by dashed arrows, the number of operations of transferring read data Dr and Er between the FPGA boards 3 increases as compared to that of the pipeline processing illustrated in FIG. 8.

Next, the priority of an integration process when there are three integratable processes or more will be described by using FIGS. 11 to 14.

Figure 11:
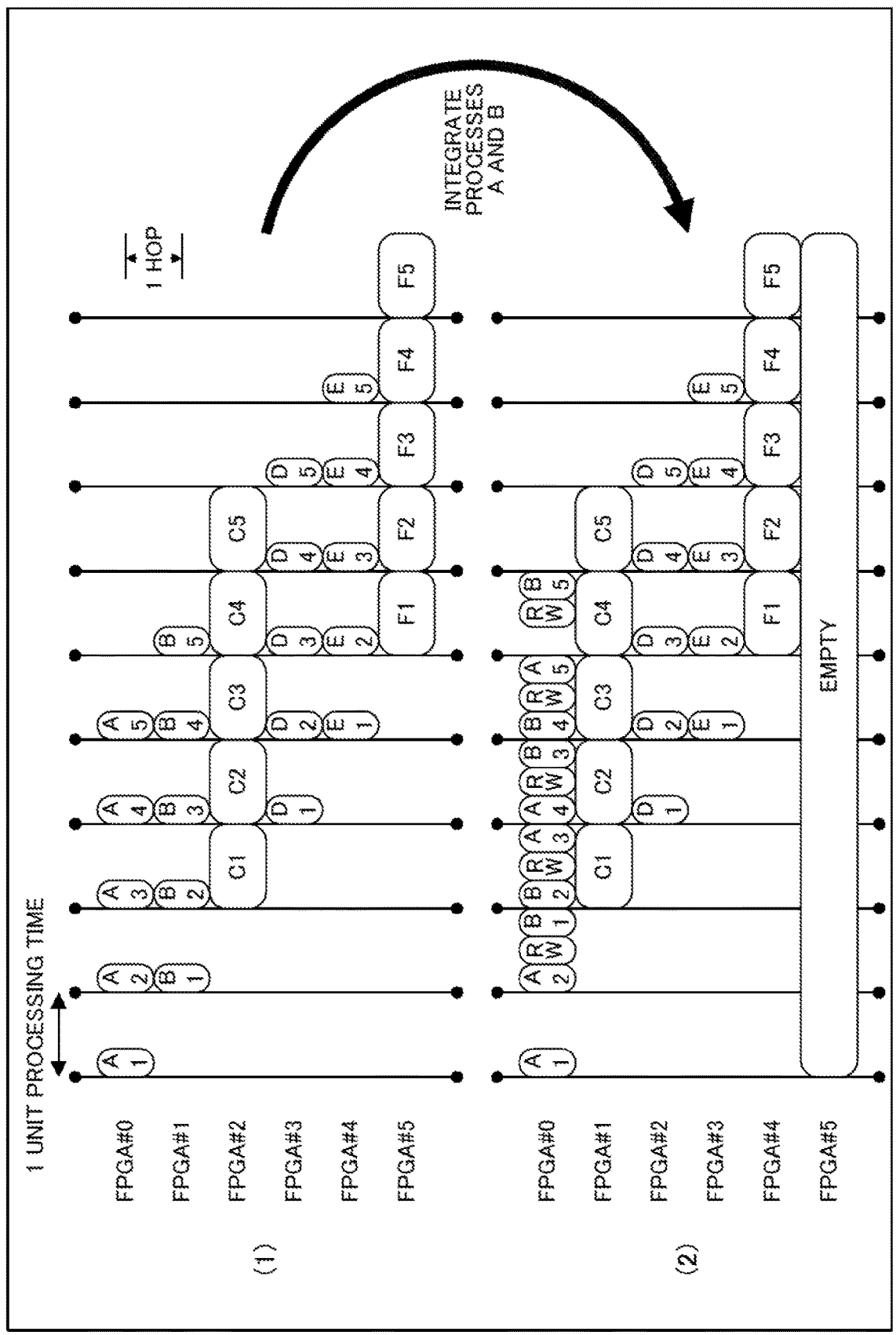
FIG. 11 is a diagram for describing a third example of an execution order of data pipeline processing and a first integration example of the data pipeline processing.

(1) of FIG. 11 is a diagram for describing a third example of an execution order of data pipeline processing and (2) of FIG. 11 is a diagram for describing a first integration example of the data pipeline processing illustrated in (1) of FIG. 11.

In the example illustrated in (1) of FIG. 11, the execution time of the processes A1 to A5, the processes B1 to B5, the processes D1 to D5, and the processes E1 to E5 is suffi-ciently smaller than 1 unit processing time. In the example illustrated in (1) of FIG. 11, the execution time of the processes C1 to C5 and the processes F1 to F5 is approximately the same as 1 unit processing time. That is, in the example illustrated in (1) of FIG. 11, four integratable processes A1 to A5, B1 to B5, D1 to D5, and E1 to E5 are present. The pipeline processing illustrated in (1) of FIG. 11 is similar to the pipeline processing illustrated in FIG. 7.

In the example illustrated in (2) of FIG. 11, the control unit 15 causes the FPGA #0 to execute the processes A1 to A5 and B1 to B5 allocated to two FPGAs #0 and #1, respectively, which are adjacent (that is, at the distance of 1 hop) in the connection relation. The flow of data in the pipeline processing illustrated in (2) of FIG. 11 is similar to the flow of data in the pipeline processing illustrated in FIG. 8.

Figure 12:
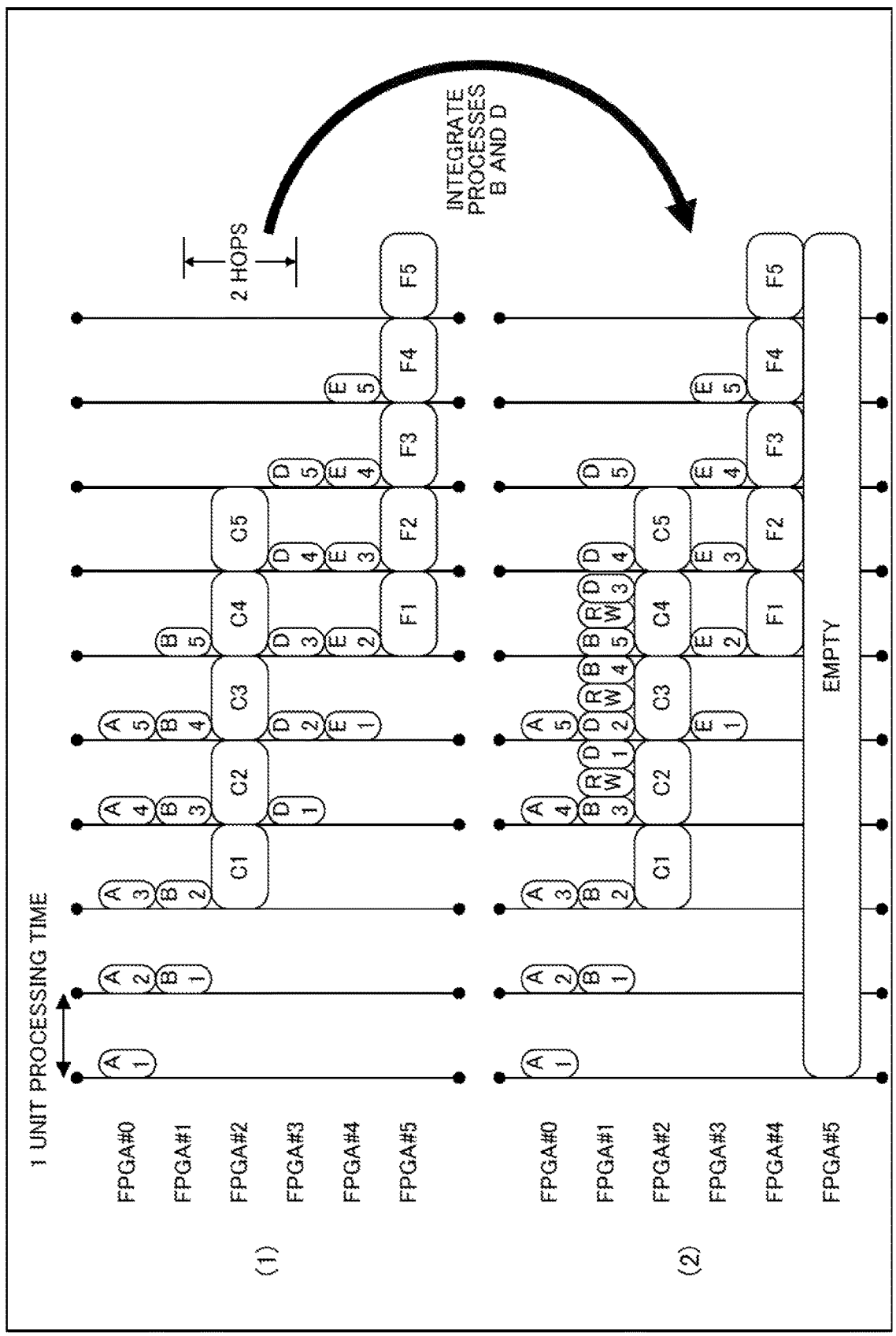
FIG. 12 is a diagram for describing a third example of an execution order of data pipeline processing and a second integration example of the data pipeline processing.

(1) of FIG. 12 is a diagram for describing a third example of an execution order of data pipeline processing and (2) of FIG. 12 is a diagram for describing a second integration example of the data pipeline processing illustrated in (1) of FIG. 12.

The execution order of the data pipeline processing illustrated in (1) of FIG. 12 is similar to the execution order of the data pipeline processing illustrated in (1) of FIG. 11.

In the example illustrated in (2) of FIG. 12, the control unit 15 causes the FPGA #1 to execute the processes B1 to B5 and D1 to D5 allocated to two FPGAs #1 and #3, respectively, which are not adjacent (that is, at the distance of 2 hops) in the connection relation. The flow of data in the pipeline processing illustrated in (2) of FIG. 12 is similar to the flow of data in the pipeline processing illustrated in FIG. 10.

Figure 13:
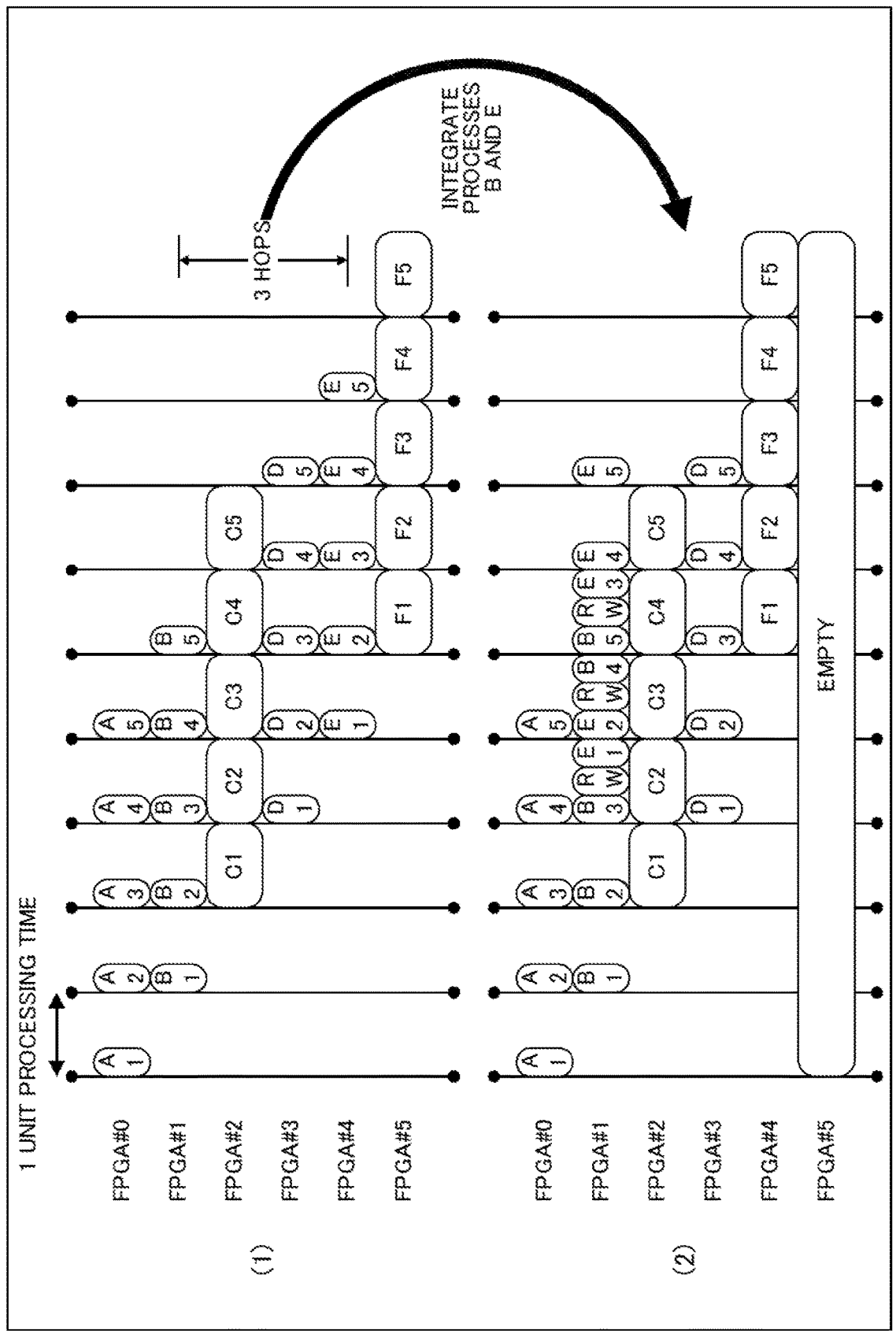
FIG. 13 is a diagram for describing a third example of an execution order of data pipeline processing and a third integration example of the data pipeline processing.

(1) of FIG. 13 is a diagram for describing a third example of an execution order of data pipeline processing and (2) of FIG. 13 is a diagram for describing a third integration example of the data pipeline processing illustrated in (1) of FIG. 13.

The execution order of the data pipeline processing illustrated in (1) of FIG. 13 is similar to the execution order of the data pipeline processing illustrated in (1) of FIGS. 11 and (1) of FIG. 12.

In the example illustrated in (2) of FIG. 13, the control unit 15 causes the FPGA #1 to execute the processes B1 to B5 and E1 to E5 allocated to two FPGAs #1 and #4, respectively, which are not adjacent (that is, at the distance of 3 hops) in the connection relation.

Figure 14:
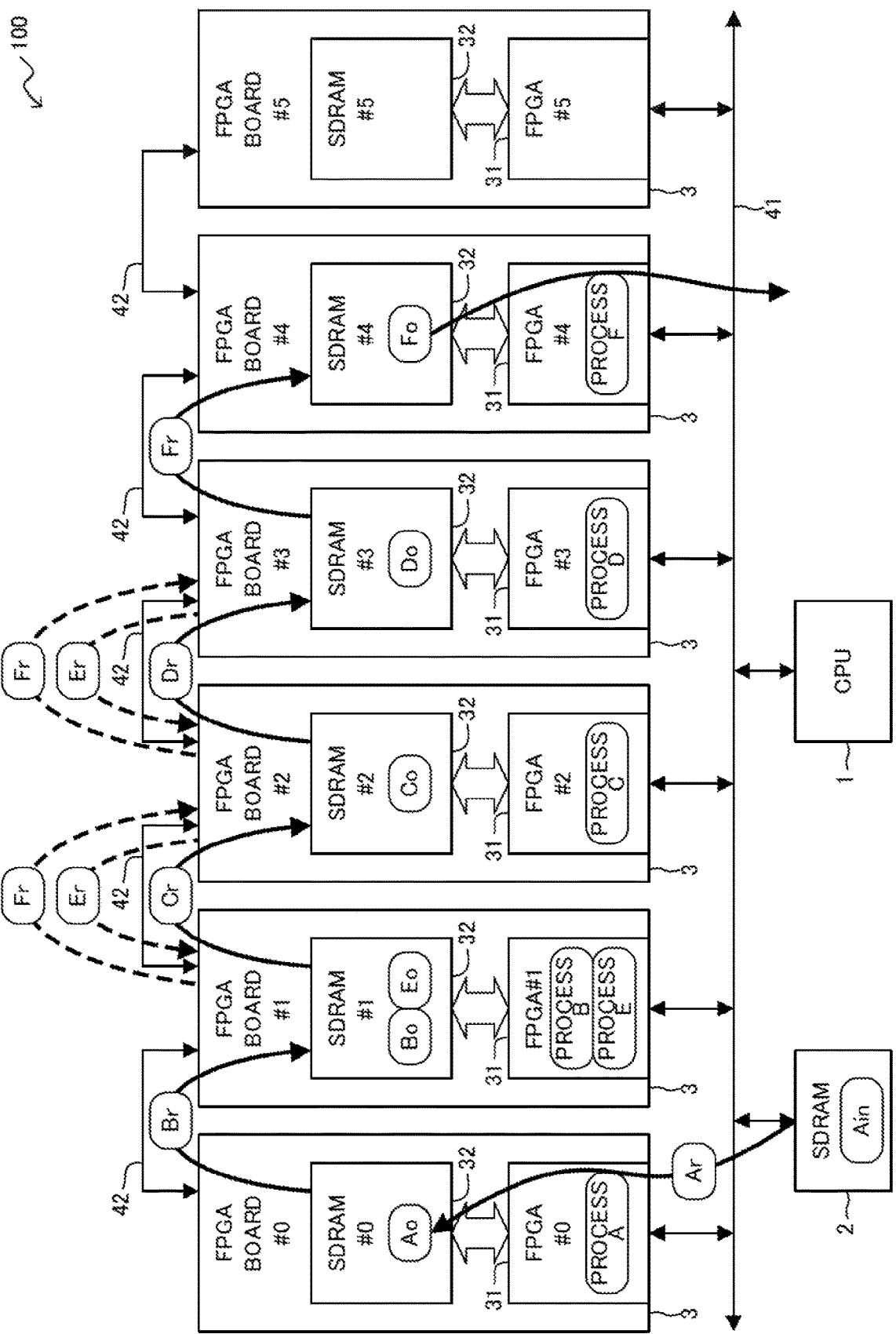
FIG. 14 is a block diagram for describing the flow of data in the data pipeline processing illustrated in FIG. 13.

FIG. 14 is a block diagram for describing the flow of data in the data pipeline processing illustrated in (2) of FIG. 13.

First, input data Ain stored in the SDRAM 2 is read via the common bus 41 as read data Ar and the FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 42 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 42 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #3 via the broadband bus 42 as read data Dr. The FPGA #3 executes a process D by using the read data Dr. The output of the process D is stored in the SDRAM #3 as output data Do.

The output data Do stored in the SDRAM #3 is transferred from the FPGA board #3 to the FPGA board #1 through the FPGA board #2 via the broadband bus 42 as read data Er. The FPGA #1 executes a process E by using the read data Er. The output of the process E is stored in the SDRAM #1 as output data Eo.

The output data Eo stored in the SDRAM #1 is transferred from the FPGA board #1 to the FPGA board #4 through the FPGA boards #2 and #3 via the broadband bus 42 as read data Fr. The FPGA #4 executes a process F by using the read data Fr. The output of the process F is stored in the SDRAM #4 as the output data Fo.

The output data Fo stored in the SDRAM #4 is output from the FPGA board #4 via the common bus 41 and is stored in the SDRAM 2, for example.

In the pipeline processing illustrated in FIG. 14, as indicated by dashed arrows, an operation of transferring two items of read data Er and two items of read data Fr between the FPGA boards 3 is increased as compared to that of the pipeline processing illustrated in FIG. 8.

The control unit 15 causes a FPGA 31 to integrate and execute processes allocated to other FPGAs 31 connected at positions closest to a FPGA 31 that executes an integrated process in the connection relation between a plurality of FPGAs 31.

As illustrated in (2) of FIG. 11 among the integration examples of (2) of FIG. 11, (2) of FIGS. 12, and (2) of FIG. 13, the control unit 15 integrates the processes A and B allocated to the FPGAs #0 and #1, respectively, at the distance of 1 hop with the highest priority. In the pipeline processing illustrated in (2) of FIG. 11, as illustrated in FIG. 8, the data transfer amount between the FPGA boards 3 is suppressed as much as possible.

A case in which the first and second determination units 13 and 14 determine that integration of the processes A and B illustrated in (1) of FIG. 11 is not possible will be discussed. In this case, as illustrated in (2) of FIG. 12 among the integration examples of (2) of FIG. 11, (2) of FIGS. 12, and (2) of FIG. 13, the control unit 15 integrates the processes B and D allocated to the FPGAs #1 and #3, respectively, at the distance of 2 hops with the next highest priority. In the pipeline processing illustrated in (2) of FIG. 12, as illustrated in FIG. 10, the number of times of the operation of transferring data between the FPGA boards 3 is increased by 2 times from the smallest number of times (see dashed arrows in FIG. 10).

A case in which the first and second determination units 13 and 14 determine that integration of the processes A and B illustrated in (1) of FIG. 11 and integration of the processes B and D illustrated in (1) of FIG. 12 are not possible will be discussed. In this case, as illustrated in (2) of FIG. 13 among the integration examples of (2) of FIG. 11, (2) of FIGS. 12, and (2) of FIG. 13, the control unit 15 integrates the processes B and E allocated to the FPGAs #1 and #4, respectively, at the distance of 3 hops. In the pipeline processing illustrated in (2) of FIG. 13, as illustrated in FIG. 14, the number of times of the operation of transferring data between the FPGA boards 3 is increased by four times from the smallest number of times (see dashed arrows in FIG. 14).

In this manner, the control unit 15 selects two processes to be integrated on the basis of the distance between the FPGAs 31. That is, the processes of the FPGAs 31 at the smallest distance (that is, "the small number of hops") are integrated with high priority. In this way, it is possible to suppress the communication load of the information processing system 100.

[B-2] Operation

Figure 15:
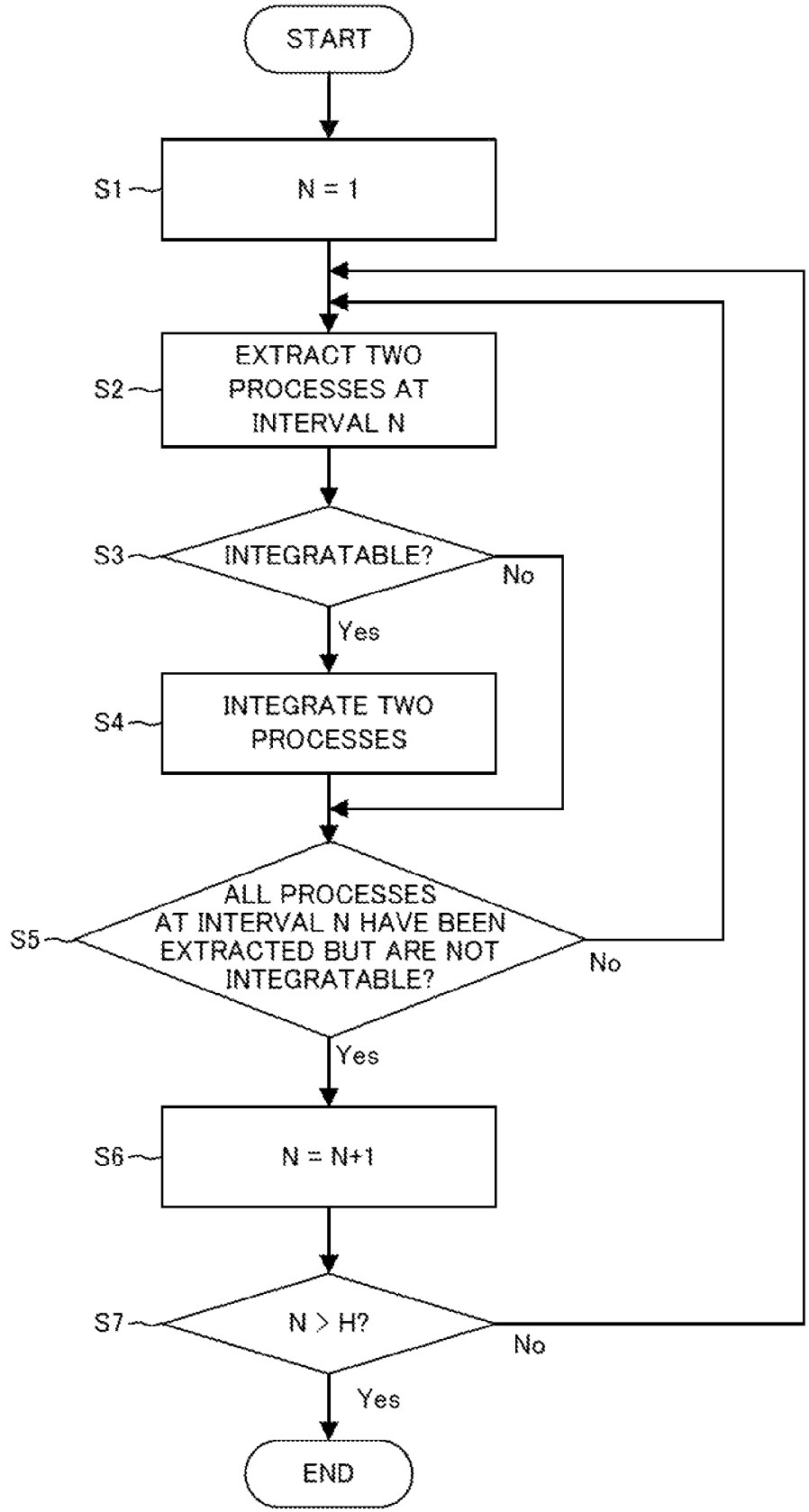
FIG. 15 is a flowchart for describing an integration operation of the data pipeline processing of the information processing system illustrated in FIG. 3.

An integration operation of the data pipeline processing of the information processing system 100 according to an example of the embodiment will be described with reference to the flowchart (steps S1 to S7) illustrated in FIG. 15.

The control unit 15 sets the number of hops N to 1 (step S1). In this way, the control unit 15 searches an integratable process allocated to the FPGA 31 at the number of hops N of 1 from the FPGA 31 that executes two processes in an integrated manner.

The control unit 15 extracts two processes having the number of hops (that is, "interval") N among a plurality of processes allocated to the FPGAs 31 (step S2).

The control unit 15 determines whether two processes are integratable on the basis of the determination results obtained by the first and second determination units 13 and 14 (step S3).

When the two processes are not integratable (see the route "No" in step S3), the process proceeds to step S5.

On the other hand, when the two processes are integratable (see the route "Yes" in step S3), the control unit 15 integrates the two processes (step S4).

The control unit 15 determines whether all processes having the number of hops (that is, "interval") N have been extracted but are not integratable (step S5).

When all processes having the interval of N have not been extracted or there are an integratable process (see the route "No" in step S5), the process returns to step S2.

On the other hand, when all processes having the interval of N have been extracted but are not integratable (see the route "Yes" in step S5), the control unit 15 increments the number of hops N by 1 (step S6).

The control unit 15 determines whether the number of hops N is larger than a threshold H (step S7).

When the number of hops N is equal to or smaller than the threshold H (see the route "No" in step S7), the process returns to step S2.

On the other hand, when the number of hops N is larger than the threshold H (see the route "Yes" in step S7), the process ends.

In this manner, the first determination unit 13 determines whether the sum of the execution time of a first process, the execution time of a second process, and the time taken for one FPGA board 3 to rewrite a logic for executing the first process to a logic for executing the second process is equal to or smaller than a unit time. The second determination unit 14 determines whether a data traffic between the plurality of FPGAs 31 is equal to or smaller than a threshold when the first and second processes are executed by one FPGA 31. When the first determination unit determines that the sum is equal to or smaller than the unit time and the second determination unit determines that the data traffic is equal to or smaller than the threshold, the control unit 15 causes one FPGA 31 to execute the first and second processes.

In this way, it is possible to improve the efficiency of pipeline processing and utilize hardware resources effectively.

The control unit 15 causes an integration destination FPGA 31 to execute a process allocated to another FPGA 31 connected at the position closest to the integration destination FPGA 31 in the connection relation between a plurality of FPGAs 31 as a second process. Moreover, the data traffic is measured by the monitoring circuit 312 provided in the plurality of FPGAs 31 every unit time.

Due to these, it is possible to suppress the communication load of the information processing system 100.

[C] MODIFICATION

In the drawings to be described later, similar portions are denoted by the same reference numerals, and the description thereof will not be provided.

Figure 16:
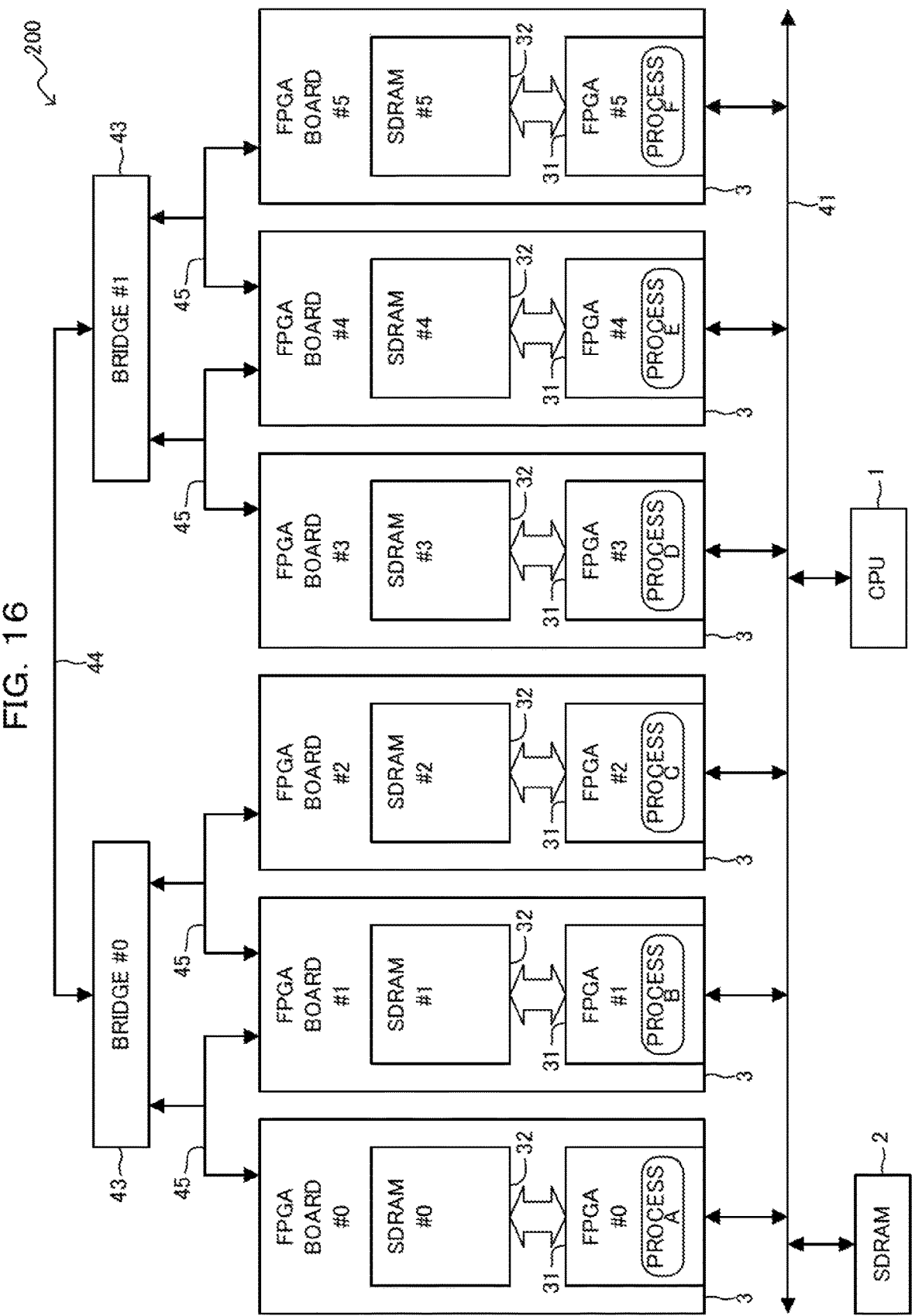
FIG. 16 is a block diagram illustrating a hardware configuration example of an information processing system according to a modification of the embodiment.

FIG. 16 is a block diagram illustrating a hardware configuration example of an information processing system 200 according to a modification of the embodiment.

The topology of the broadband bus 42 is not limited to the configuration in which the broadband bus 42 is connected between the adjacent FPGA boards 3 illustrated in FIG. 3 and the like. That is, as illustrated in FIG. 16, the FPGA boards 3 may be connected to another plurality of FPGA boards 3 via the bridge 43.

The information processing system 200 according to the modification illustrated in FIG. 16 includes one or more (in the example illustrated in FIG. 16, two) bridges 43 (which may be referred to as bridges #0 or #1) in addition to the functional configuration included in the information processing system 100 illustrated in FIG. 3 and the like.

In the example illustrated in FIG. 16, a broadband bus 45 connects FPGA boards #0 and #1 and FPGA boards #1 and #2. Moreover, in the example illustrated in FIG. 16, the broadband bus 45 connects FPGA boards #3 and #4 and FPGA boards #4 and #5.

In the example illustrated in FIG. 16, the FPGA boards #0 to #2 are connected to each other via the broadband bus 45 and the bridge #0 and the FPGA boards #3 to #5 are connected to each other via the broadband bus 45 and the bridge #1.

The bridges #0 and #1 are connected via a broadband bus 44. The broadband bus 44 connects any one of the FPGA boards #0 to #2 and any one of the FPGA boards #3 to #5 via the bridges #0 and #1.

In the example illustrated in FIG. 16, the FPGAs #0 to #5 execute processes A to F, respectively.

Figure 17:
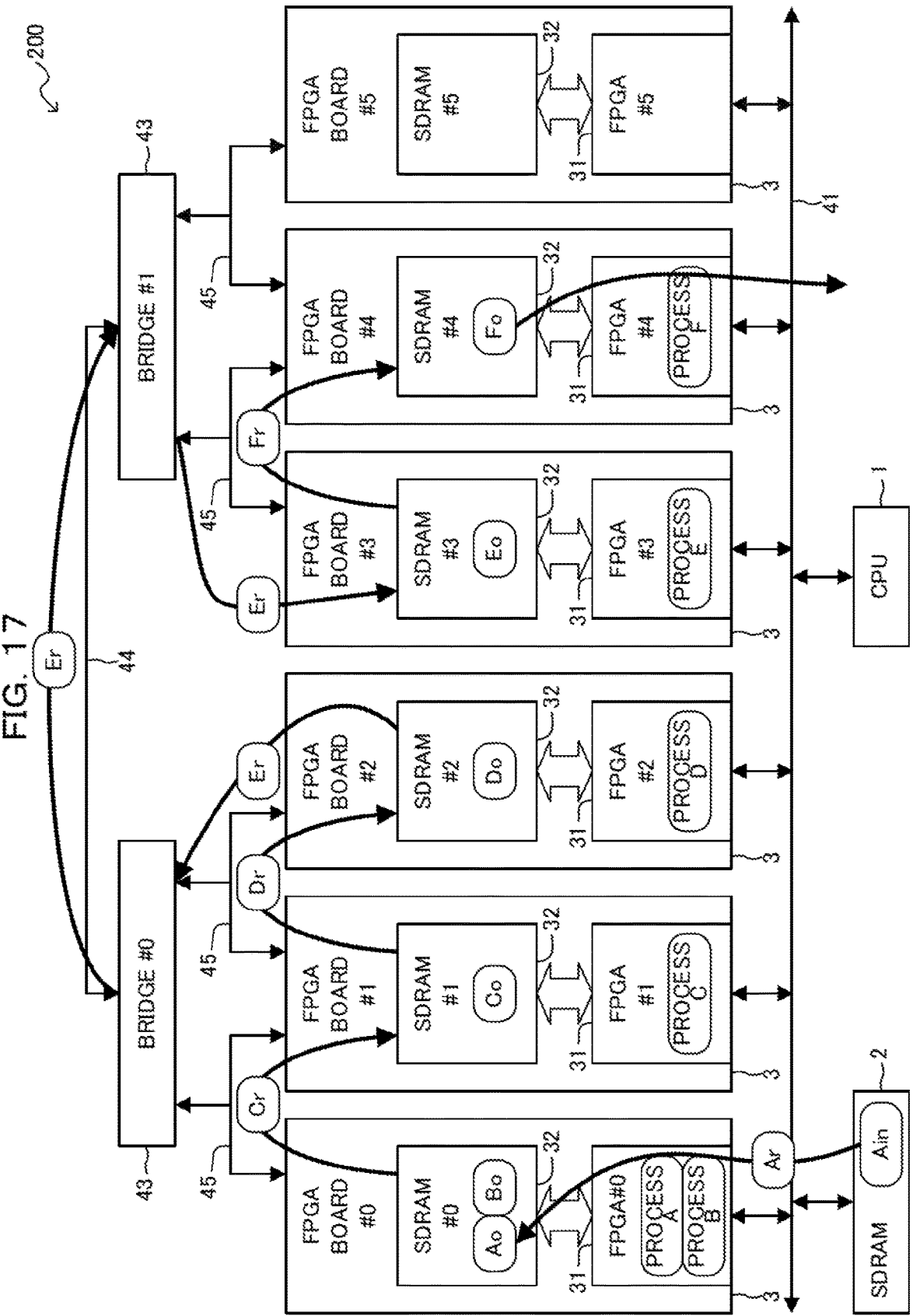
FIG. 17 is a block diagram for describing the flow of data in the data pipeline processing illustrated in FIG. 11 in the information processing system of the modification illustrated in FIG. 16.

FIG. 17 is a block diagram for describing the flow of data in the data pipeline processing illustrated in (2) of FIG. 11 in the information processing system 200 of the modification illustrated in FIG. 16.

In the information processing system 200 illustrated in FIG. 16, when the processes A and B are integrated as illustrated in (2) of FIG. 11 with respect to the pipeline processing illustrated in (1) of FIG. 11, the data communication between the FPGA boards 3 is as illustrated in FIG. 17.

First, the input data Ain stored in the SDRAM 2 is read via the common bus 41 as read data Ar. The FPGA #0 executes a process A by using the read data Ar. The output of the process A is stored in the SDRAM #0 as output data Ao.

The FPGA #0 executes a process B by using the output data Ao stored in the SDRAM #0. The output of the process B is stored in the SDRAM #0 as output data Bo.

The output data Bo stored in the SDRAM #0 is transferred from the FPGA board #0 to the FPGA board #1 via the broadband bus 45 as read data Cr. The FPGA #1 executes a process C by using the read data Cr. The output of the process C is stored in the SDRAM #1 as output data Co.

The output data Co stored in the SDRAM #1 is transferred from the FPGA board #1 to the FPGA board #2 via the broadband bus 45 as read data Dr. The FPGA #2 executes a process D by using the read data Dr. The output of the process D is stored in the SDRAM #2 as output data Do.

The output data Do stored in the SDRAM #2 is transferred from the FPGA board #2 to the FPGA board #3 via the broadband bus 45, the bridge #0, the broadband bus 44, the bridge #1, and the broadband bus 45 as read data Er. The FPGA #3 executes a process E by using the read data Er. The output of the process E is stored in the SDRAM #3 as output data Eo.

The output data Eo stored in the SDRAM #3 is transferred from the FPGA board #3 to the FPGA board #4 via the broadband bus 45 as read data Fr. The FPGA #4 executes a process F by using the read data Fr. The output of the process F is stored in the SDRAM #4 as output data Fo.

The output data Fo stored in the SDRAM #4 is output from the FPGA board #4 via the common bus 41 and is stored in the SDRAM 2, for example.

As illustrated in FIG. 17, in the information processing system 200 according to a modification of the embodiment, it is possible to execute processes allocated to the FPGAs 31 which are adjacent to each other (that is, "at the number of hops of 1") in an integrated manner.

Figure 18:
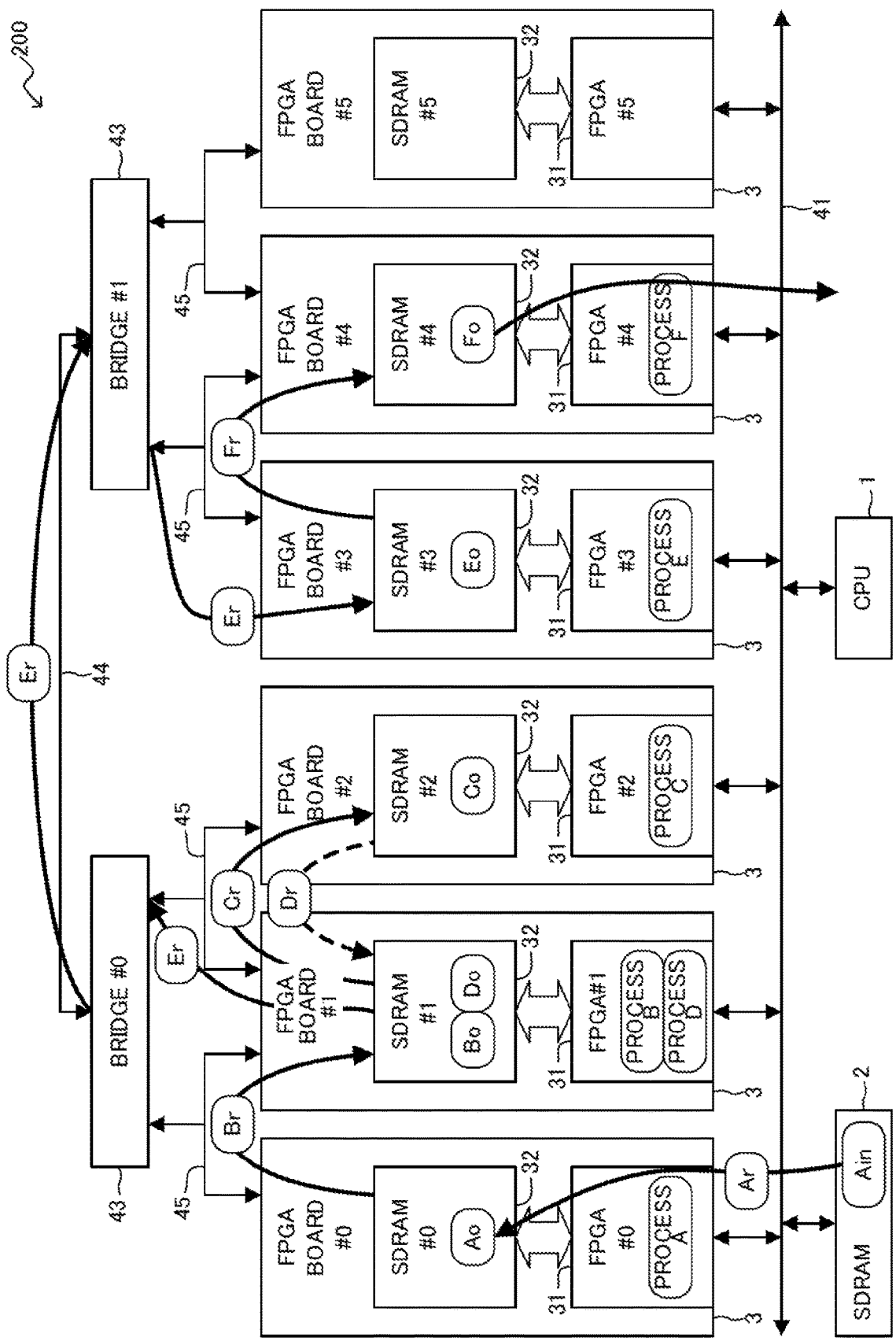
FIG. 18 is a block diagram for describing the flow of data in the data pipeline processing illustrated in FIG. 12 in the information processing system of the modification illustrated in FIG. 16.

FIG. 18 is a block diagram for describing the flow of data in the data pipeline processing illustrated in (2) of FIG. 12 in the information processing system 200 of the modification illustrated in FIG. 16.

In the information processing system 200 illustrated in FIG. 16, when the processes B and D of the pipeline processing illustrated in (1) of FIG. 12 are integrated as illustrated in (2) of FIG. 12, the data communication between the FPGA boards 3 is performed as illustrated in FIG. 18.

First, the input data Ain stored in the SDRAM 2 is read via the common bus 41 as read data Ar. The FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 45 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 45 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #1 via the broadband bus 45 as read data Dr. The FPGA #1 executes a process D by using the read data Dr. The output of the process D is stored in the SDRAM #1 as output data Do.

The output data Do stored in the SDRAM #1 is transferred from the FPGA board #1 to the FPGA board #3 via the broadband bus 45, the bridge #0, the broadband bus 44, the bridge #1, and the broadband bus 45 as read data Er. The FPGA #3 executes a process E by using the read data Er. The output of the process E is stored in the SDRAM #3 as output data Eo.

The output data Eo stored in the SDRAM #3 is transferred from the FPGA board #3 to the FPGA board #4 via the broadband bus 45 as read data Fr. The FPGA #4 executes a process F by using the read data Fr. The output of the process F is stored in the SDRAM #4 as output data Fo.

The output data Fo stored in the SDRAM #4 is output from the FPGA board #4 via the common bus 41 and is stored in the SDRAM 2, for example.

In the pipeline processing illustrated in FIG. 18, as indicated by dashed arrows, the number of operations of transferring read data Dr between the FPGA boards 3 increases as compared to that of the pipeline processing illustrated in FIG. 17.

As illustrated in FIG. 18, in the information processing system 200 according to a modification of the embodiment, it is possible to execute processes allocated to the FPGAs 31 which are not adjacent to each other (that is, "at the number of hops of 2") in an integrated manner.

Figure 19:
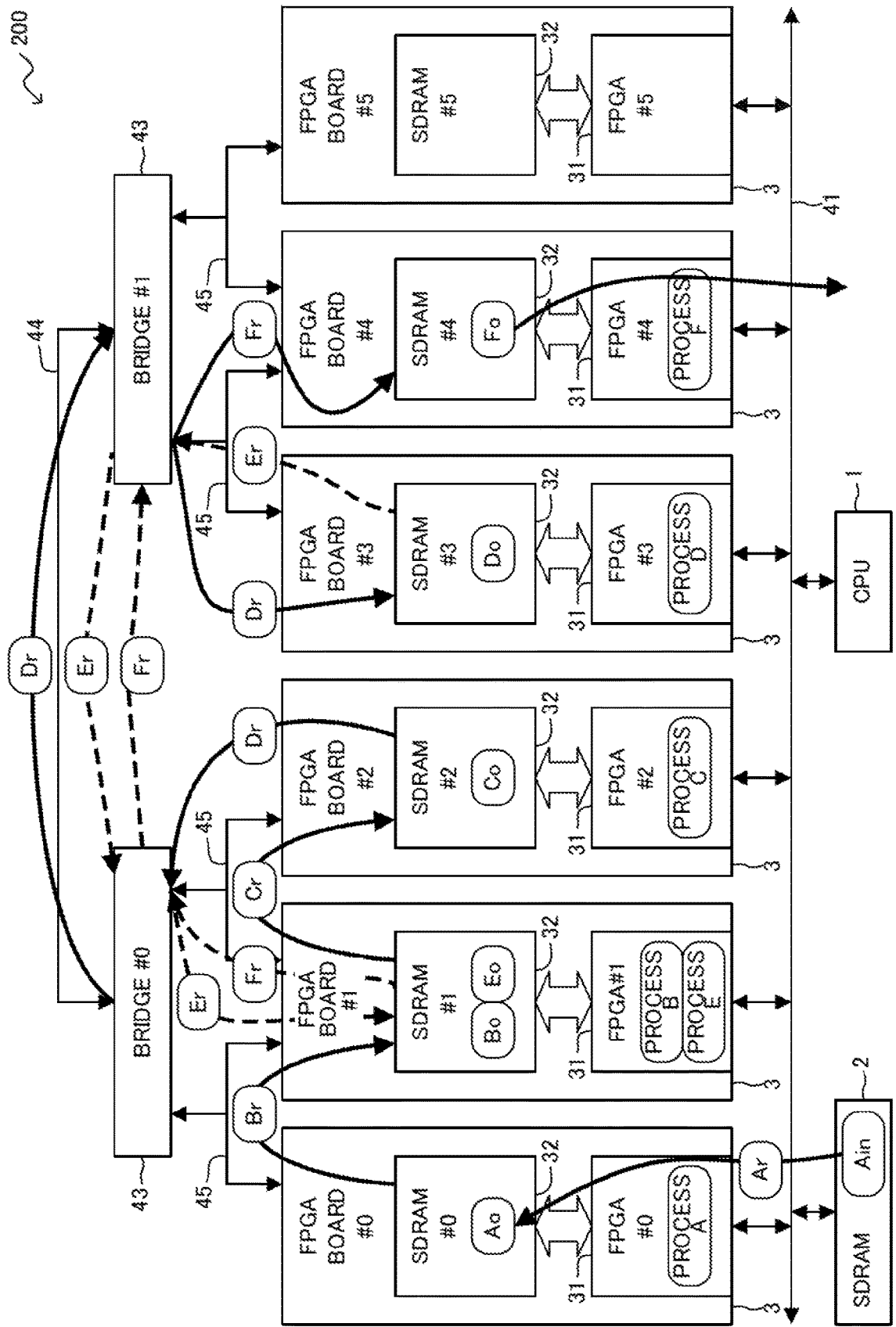
FIG. 19 is a block diagram for describing the flow of data in the data pipeline processing illustrated in FIG. 13 in the information processing system of the modification illustrated in FIG. 16.

FIG. 19 is a block diagram for describing the flow of data in the data pipeline processing illustrated in (2) of FIG. 13 in the information processing system 200 of the modification illustrated in FIG. 16.

In the information processing system 200 illustrated in FIG. 16, when the processes B and E of the pipeline processing illustrated in (1) of FIG. 13 are integrated as illustrated in (2) of FIG. 13, the data communication between the FPGA boards 3 is performed as illustrated in FIG. 19.

First, the input data Ain stored in the SDRAM 2 is read via the common bus 41 as read data Ar. The FPGA #0 executes a process A by using the read data Ar. The output of the process A is stored in the SDRAM #0 as output data Ao.

The output data Ao stored in the SDRAM #0 is transferred from the FPGA board #0 to the FPGA board #1 via the broadband bus 45 as read data Br. The FPGA #1 executes a process B by using the read data Br. The output of the process B is stored in the SDRAM #1 as output data Bo.

The output data Bo stored in the SDRAM #1 is transferred from the FPGA board #1 to the FPGA board #2 via the broadband bus 45 as read data Cr. The FPGA #2 executes a process C by using the read data Cr. The output of the process C is stored in the SDRAM #2 as output data Co.

The output data Co stored in the SDRAM #2 is transferred from the FPGA board #2 to the FPGA board #3 via the broadband bus 45, the bridge #0, the broadband bus 44, the bridge #1, and the broadband bus 45 as read data Dr. The FPGA #3 executes a process D by using the read data Dr. The output of the process D is stored in the SDRAM #3 as output data Do.

The output data Do stored in the SDRAM #3 is transferred from the FPGA board #3 to the FPGA board #1 via the broadband bus 45, the bridge #1, the broadband bus 44, the bridge #0, and the broadband bus 45 as read data Er. The FPGA #1 executes a process E by using the read data Er. The output of the process E is stored in the SDRAM #1 as output data Eo.

The output data Eo stored in the SDRAM #1 is transferred from the FPGA board #1 to the FPGA board #4 via the broadband bus 45, the bridge #0, the broadband bus 44, the bridge #1, and the broadband bus 45 as read data Fr. The FPGA #4 executes a process F by using the read data Fr. The output of the process F is stored in the SDRAM #4 as output data Fo.

The output data Fo stored in the SDRAM #4 is output from the FPGA board #4 via the common bus 41 and is stored in the SDRAM 2, for example.

In the pipeline processing illustrated in FIG. 19, as indicated by dashed arrows, an operation of transferring three items of read data Er and two items of read data Fr is increased as compared to that of the pipeline processing illustrated in FIG. 17. Each of a transfer operation between two FPGA boards 3, a transfer operation between the FPGA board 3 and the bridge 43, and a transfer operation between two bridges 43 is counted as one transfer operation.

As illustrated in FIG. 19, in the information processing system 200 according to a modification of the embodiment, it is possible to execute processes allocated to the FPGAs 31 which are not adjacent to each other (that is, "at the number of hops of 3") in an integrated manner.

The control unit 15 causes a FPGA 31 to integrate and execute processes allocated to another FPGA 31 connected at positions closest to a FPGA 31 that executes an integrated process in the connection relation between a plurality of FPGAs 31.

As illustrated in (2) of FIG. 11 among the integration examples of (2) of FIG. 11, (2) of FIGS. 12, and (2) of FIG. 13, the control unit 15 integrates the processes A and B allocated to the FPGAs #0 and #1, respectively, at the distance of 1 hop with the highest priority. In the pipeline processing illustrated in (2) of FIG. 11, as illustrated in FIG. 17, the data transfer amount between the FPGA boards 3 is suppressed as much as possible.

A case in which the first and second determination units 13 and 14 determine that integration of the processes A and B illustrated in (1) of FIG. 11 is not possible will be discussed. In this case, as illustrated in (2) of FIG. 12 among the integration examples of (2) of FIG. 11, (2) of FIGS. 12, and (2) of FIG. 13, the control unit 15 integrates the processes B and D allocated to the FPGAs #1 and #3, respectively, at the distance of 2 hops with the next highest priority. In the pipeline processing illustrated in (2) of FIG. 12, as illustrated in FIG. 18, the number of times of the operation of transferring data between the FPGA boards 3 is increased by one times from the smallest number of times (see dashed arrows in FIG. 17).

A case in which the first and second determination units 13 and 14 determine that integration of the processes A and B illustrated in (1) of FIG. 11 and integration of the processes B and D illustrated in (1) of FIG. 12 are not possible will be discussed. In this case, as illustrated in (2) of FIG. 13 among the integration examples of (2) of FIG. 11, (2) of FIGS. 12, and (2) of FIG. 13, the control unit 15 integrates the processes B and E allocated to the FPGAs #1 and #4, respectively, at the distance of 3 hops. In the pipeline processing illustrated in (2) of FIG. 13, as illustrated in FIG. 19, the number of times of the operation of transferring data between the FPGA boards 3 is increased by five times from the smallest number of times (see dashed arrows in FIG. 19).

In this manner, the control unit 15 selects two processes to be integrated on the basis of the distance between the FPGAs 31. That is, the processes of the FPGAs 31 at the smallest distance (that is, "the small number of hops") are integrated with high priority. In this way, it is possible to suppress the communication load of the information processing system 200.

[D] OTHERS

The disclosed technique is not limited to the above-described embodiment but may be modified in various ways without departing from the spirit of the present embodiment. The respective configurations and the respective processes of the present embodiment may be chosen depending on needs or may be combined appropriately.

When there are three or more integratable processes, the control unit 15 may integrate two processes allocated to a FPGA 31 of which the identification number (for example, "#0 to #5") is the smallest and a FPGA 31 of which the identification number is the next smallest. For example, in the example illustrated in (1) of FIG. 11, a process A allocated to the FPGA #0 and a process B allocated to the FPGA #1 may be integrated. In this way, it is possible to efficiently perform an integration operation of the pipeline processing.

When there are three or more integratable processes, the control unit 15 may select processes to be integrated randomly. For example, in the example illustrated in (1) of FIG. 11, a process D allocated to the FPGA #3 and a process E allocated to the FPGA #4 may be integrated. In this way, it is possible to reduce the load on the FPGAs 31 of which the identification numbers are small.

When there are four or more integratable processes, the control unit 15 may select two sets or more of processes to be integrated. For example, in the example illustrated in (1) of FIG. 11, a process A allocated to the FPGA #0 and a process B allocated to the FPGA #1 may be integrated and a process D allocated to the FPGA #3 and a process E allocated to the FPGA #4 may be also integrated. In this way, it is possible to further improve the efficiency of the pipeline processing.

The number of processes integrated and executed by one FPGA 31 is not limited to 2. When the sum of the execution time of three or more processes and the logic rewrite time is equal to or smaller than 1 unit processing time, the three or more processes may be executed by one FPGA 31 in an integrated manner. In this way, it is possible to further improve the efficiency of the pipeline processing.

According to the above example or modification of the embodiment, it is possible to improve the efficiency of the pipeline processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control apparatus communicably connected to a plurality of processing apparatuses, the control apparatus comprising:
    a processor configured to, when a first process is scheduled to be executed in a first reconfiqurable circuit of a first processing apparatus, and a second process is scheduled to be executed in a second reconfigurable circuit of a second processing apparatus, of the plurality of processing apparatuses respectively:
        determine whether a sum of an execution time of the first process, an execution time of the second process, and a time taken for the first reconfigurable circuit to reconfigure a first configuration for executing the first process to a second configuration for executing the second process is equal to or smaller than a certain time;
        determine whether a data traffic which is expected between the plurality of processing apparatuses is equal to or smaller than a threshold when the first processing apparatus executes the first and second processes;
        cause the first processing apparatus to execute both of the first process and the second process when it is determined that the sum is equal to or smaller than the certain time and when it is determined that the data traffic is equal to or smaller than the threshold; and
        cause the first processing apparatus and the second processing apparatus to execute the first process and the second process respectively when it is determined that the sum is more than the certain time and when it is determined that the data traffic is more than the threshold.

2. The control apparatus according to claim 1, wherein the processor is further configured to cause the first processing apparatus to execute a process allocated to a second processing apparatus connected to the first processing apparatus at a nearest position among the plurality of processing apparatus in a connection relation between the plurality of processing apparatuses as the second process.

3. The control apparatus according to claim 1, wherein the data traffic is measured every unit time by the plurality of processing apparatuses.

4. The control apparatus according to claim 2, wherein the data traffic is measured every unit time by the plurality of processing apparatuses.

5. An information processing system comprising:
    a plurality of processing circuits including a first processing circuit; and
    a control apparatus communicably connected to the plurality of processing apparatuses, the control apparatus includes a processor configured to, when a first process is scheduled to be executed in a first reconfigurable circuit of a first processing apparatus, and a second process is scheduled to be executed in a second reconfigurable circuit of a second processing apparatus, of the plurality of processing apparatuses respectively:
        determine whether a sum of an execution time of the first process, an execution time of the second process, and a time taken for the first reconfigurable circuit to a second configuration for executing the second process is equal to or smaller than a certain time;
        determine whether a data traffic which is expected between the plurality of processing apparatuses is equal to or smaller than a threshold when the first processing apparatus executes the first and second processes;
        cause the first processing apparatus to execute both of the first process and the second process when it is determined that the sum is equal to or smaller than the certain time and when it is determined that the data traffic is equal to or smaller than the threshold; and
        cause the first processing apparatus and the second processing apparatus to execute the first process and the second process respectively when it is determined that the sum is more than the certain time and when it is determined that the data traffic is more than the threshold.

6. The information processing system according to claim 5, wherein
    the plurality of processing apparatuses further include a second processing apparatus connected to the first processing apparatus at a nearest position in a connection relation between the plurality of processing apparatuses, and
    the processor is further configured to cause the first processing apparatus to execute a process allocated to the second processing apparatus as the second process.

7. The information processing system according to claim 5, wherein the plurality of processing apparatuses measure the data traffic every unit time.

8. The information processing system according to claim 6, wherein the plurality of processing apparatuses measure the data traffic every unit time.

9. A computer-readable non-transitory recording medium having stored therein a program for causing a computer communicably connected to a plurality of processing apparatuses to execute a process comprising, when a first process is scheduled to be executed in a first reconfigurable circuit of a first processing apparatus, and a second process is scheduled to be executed in a second reconfigurable circuit of a second processing apparatus, of the plurality of processing apparatuses respectively:
- determining whether a sum of an execution time of the first process, an execution time of the second process, and a time taken for the first reconfigurable circuit to reconfigure a first configuration for executing the first process to a second configuration for executing the second process is equal to or smaller than a certain time;
- determining whether a data traffic which is expected between the plurality of processing apparatuses is equal to or smaller than a threshold when the first processing apparatus executes the first and second processes;
- cause the first processing apparatus to execute both of the first process and the second process when it is determined that the sum is equal to or smaller than the certain time and when it is determined that the data traffic is equal to or smaller than the threshold; and
- cause the first processing apparatus and the second processing apparatus to execute the first process and the second process respectively when it is determined that the sum is more than the certain time and when it is determined that the data traffic is more than the threshold.

10. The computer-readable non-transitory recording medium having stored therein a program according to claim 9, wherein the process further comprises causing the first processing apparatus to execute a process allocated to a second processing apparatus connected to the first processing apparatus at a nearest position among the plurality of processing apparatus in a connection relation between the plurality of processing apparatuses as the second process.

11. The computer-readable non-transitory recording medium having stored therein a program according to claim 9, wherein the data traffic is measured every unit time.

12. The computer-readable non-transitory recording medium having stored therein a program according to claim 10, wherein the data traffic is measured every unit time.

13. An information processing method of causing a control apparatus communicably connected to a plurality of processing apparatuses to execute a process comprising, when a first process is scheduled to be executed in a first reconfiqurable circuit of a first processing apparatus, and a second process is scheduled to be executed in a second reconfigurable circuit of a second processing apparatus, of the plurality of processing apparatuses respectively:
- determining whether a sum of an execution time of the first process, an execution time of the second process, and a time taken for the first reconfigurable circuit to reconfigure a first configuration for executing the first process to a second configuration for executing the second process is equal to or smaller than a certain time;
- determining whether a data traffic which is expected between the plurality of processing apparatuses is equal to or smaller than a threshold when the first processing apparatus executes the first and second processes;
- causing the first processing apparatus to execute both of the first process and the second process when it is determined that the sum is equal to or smaller than the certain time and when it is determined that the data traffic is equal to or smaller than the threshold; and
- cause the first processing apparatus and the second processing apparatus to execute the first process and the second process respectively when it is determined that the sum is more than the certain time and when it is determined that the data traffic is more than the threshold.

14. The information processing method according to claim 13, wherein
the process further comprises causing the first processing apparatus to execute a process allocated to a second processing apparatus connected to the first processing apparatus at a nearest position among the plurality of processing apparatus in a connection relation between the plurality of processing apparatuses as the second process.

15. The information processing method according to claim 13, wherein the plurality of processing apparatuses measure the data traffic every unit time.

16. The information processing method according to claim 14, wherein the plurality of processing apparatuses measure the data traffic every unit time.

* * * * *